United States Patent
Shukunami et al.

(10) Patent No.: US 9,093,816 B2
(45) Date of Patent: Jul. 28, 2015

(54) TRANSMISSION APPARATUS AND TRANSMISSION SYSTEM

(75) Inventors: Norifumi Shukunami, Kawasaki (JP); Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 640 days.

(21) Appl. No.: 13/168,580

(22) Filed: Jun. 24, 2011

(65) Prior Publication Data

US 2011/0317255 A1 Dec. 29, 2011

(30) Foreign Application Priority Data

Jun. 28, 2010 (JP) .................................. 2010-146691

(51) Int. Cl.
H04B 10/04 (2011.01)
H04B 10/17 (2011.01)
H04J 14/06 (2006.01)
H01S 3/067 (2006.01)

(52) U.S. Cl.
CPC .................... H01S 3/06766 (2013.01)
USPC ........................... 359/341.1; 398/74; 398/160

(58) Field of Classification Search
USPC .................. 359/341.1; 398/74, 160
See application file for complete search history.

(56) References Cited

U.S. PATENT DOCUMENTS

| | | | |
|---|---|---|---|
| 5,636,046 A | 6/1997 | Ishikawa et al. | |
| 5,841,557 A * | 11/1998 | Otsuka et al. | 398/65 |
| 6,038,357 A * | 3/2000 | Pan | 385/24 |
| 2005/0281557 A1 | 12/2005 | Fishman et al. | |
| 2009/0245809 A1 | 10/2009 | Nakamoto | |
| 2011/0170869 A1 * | 7/2011 | Mandai et al. | 398/65 |
| 2012/0207474 A1 * | 8/2012 | Inoue et al. | 398/65 |

FOREIGN PATENT DOCUMENTS

| | | |
|---|---|---|
| EP | 1043859 A2 | 10/2000 |
| JP | 7-107069 A | 4/1995 |
| JP | 2000-354006 | 12/2000 |
| JP | 2006-005938 | 1/2006 |
| JP | 2009-239555 | 10/2009 |

OTHER PUBLICATIONS

Bruyére, F. et al., "Demonstration of an optimal polarization scrambler for long-haul optical amplifier systems", Photonics Technology Letters, IEEE, vol. 6, Issue 9, Sep 1, 1994, pp. 1153-1155.

Davidson, C. R. et al., "Spectral Dependence of Polarization Hole-Burning", Optical Fiber Communication Conference, 2006 and the 2006 National Fiber Optic Engineers Conference. OFC 2006, Mar. 5, 2006, pp. 1-3.

* cited by examiner

*Primary Examiner* — Eric Bolda
(74) *Attorney, Agent, or Firm* — Fujitsu Patent Center

(57) ABSTRACT

An optical transmission apparatus includes an optical amplifier configured to amplify a wavelength-division multiplexed signal light using an amplifying medium doped with a rare earth ion, a first optical transmitter configured to output a wavelength of a dual-polarization-multiplexed signal to a short wavelength side of an amplification band of the optical amplifier, a second optical transmitter configured to output a wavelength of a non polarization-multiplexed signal to a long wavelength side of the amplification band of the optical amplifier, and an optical multiplexer configured to input a wavelength-division multiplexed signal to the optical amplifier, the wavelength-division multiplexed signal comprising the non polarization-multiplexed signal and the dual-polarization-multiplexed signal.

7 Claims, 29 Drawing Sheets

TRANSMISSION APPARATUS AND TRANSMISSION SYSTEM

CROSS-REFERENCE TO RELATED APPLICATIONS

This application is based upon and claims the benefit of priority of the prior Japanese Patent Application No. 2010-146691, filed on Jun. 28, 2010, the entire contents of which are incorporated herein by reference.

FIELD

The embodiments discussed herein are related to a transmission apparatus and a transmission system.

BACKGROUND

A wavelength-division multiplexing (WDM) transmission system is capable of transmitting a large amount of information by multiplexing signal lights modulated by various modulation methods. Methods for modulating signal lights for the WDM system include an on-off keying (OOK) modulation method and an optical phase modulation method. The OOK modulation method is a method in which information is transmitted and received by switching light between on and off, and is used for a transmitter-receiver having a bit rate of about 10 Giga-bits per second (Gbps). In contrast, the optical phase modulation method is a method in which information is transmitted and received by changing the phase of light, and is used for a transmitter-receiver having a bit rate of about 40 Gbps. The optical phase modulation method has a noise tolerance and a variation tolerance greater than the OOK modulation method.

The optical phase modulation method includes a differential phase-shift keying (DPSK) modulation method and a differential quadrature phase-shift keying (DQPSK) modulation method. The DPSK modulation method includes various types of modulation methods such as, for example, non-return-to-zero DPSK (NRZ-DPSK). Furthermore, a modulation method called a "dual-polarization quadrature phase-shift keying (DP-QPSK)" modulation method has been developed in recent years. In the DP-QPSK modulation method, polarized waves are multiplexed in order to transmit and receive information at about 100 Gbps. A dual-polarization-multiplexed signal includes a DP-QPSK modulation signal, for example. A non polarization-multiplexed signal includes a DPSK modulation signal and an intensity modulation signal, for example.

In the WDM transmission system, a signal light is relayed by using an amplifier called an "erbium-doped fiber amplifier (EDFA)". The EDFA is an amplifier in which a fiber doped with a rare earth ion is used as an optical amplification medium. In addition, the EDFA collectively amplifies signal lights having wavelengths in a band extending from 1530 nm to 1625 nm. In particular, in the band of wavelengths amplified by the EDFA, a band extending from 1530 nm to 1565 nm is called a "C band", and a band extending from 1565 nm to 1625 nm is called an "L band". Japanese Laid-open Patent Publication No. 7-107069 is an example of the related art.

In the case of the above-described EDFA, however, a phenomenon called "polarization hole burning (PHB)" occurs, thereby deteriorating the transmission quality. PHB is a phenomenon in which the EDFA obtains polarization-dependent gain (PDG) in accordance with the polarization status of a signal light input to the EDFA. Due to the effect of PHB, gain for amplified spontaneous emission (ASE), which is a noise component generated in the EDFA, may be large depending on the status of polarized waves of the signal light.

SUMMARY

According to an aspect of the invention, an optical transmission apparatus includes an optical amplifier configured to amplify a wavelength-division multiplexed signal light using an amplifying medium doped with a rare earth ion, a first optical transmitter configured to output a wavelength of a dual-polarization-multiplexed signal to a short wavelength side of an amplification band of the optical amplifier, a second optical transmitter configured to output a wavelength of a non polarization-multiplexed signal to a long wavelength side of the amplification band of the optical amplifier, and an optical multiplexer configured to input a wavelength-division multiplexed signal to the optical amplifier, the wavelength-division multiplexed signal comprising the non polarization-multiplexed signal and the dual-polarization-multiplexed signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Transmission apparatuses and transmission systems according to embodiments will be described in detail hereinafter with reference to the drawings. It is to be noted that the present invention is not limited by these embodiments.

Figure 1:
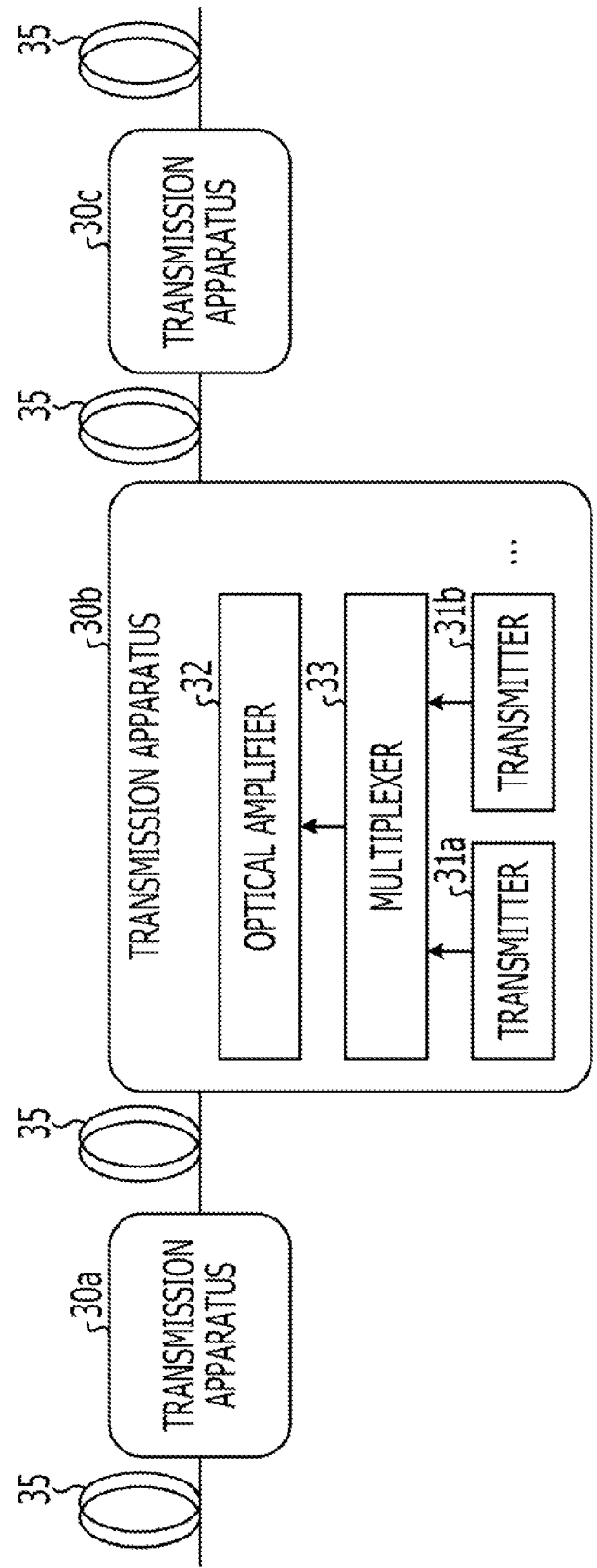
FIG. 1 is a diagram illustrating the configuration of an optical transmission system according to an embodiment.

FIG. 1 is a diagram illustrating the configuration of an optical transmission system according to an embodiment. As illustrated in FIG. 1, the optical transmission system has a plurality of transmission apparatuses 30 that are optically connected by transmission paths 35. Here, the configuration of a transmission apparatus 30b will be described as an example. The configuration of transmission apparatuses 30a and 30c is the same as that of the transmission apparatus 30b.

As illustrated in FIG. 1, the transmission apparatus 30b has transmitters 31a and 31b, an optical amplifier 32, and an optical multiplexer 33. The transmitters 31a and 31b may output signal lights obtained by a non polarization-multiplexed signal, for example. A signal light obtained by DP-QPSK herein refers to a signal light modulated by a DP-QPSK modulation method. A signal light obtained by non polarization-multiplexed signal refers to a signal light modulated by an OOK modulation method or by a phase modulation method other than the dual polarization multiplexed signal modulation method.

The optical amplifier 32 amplifies a signal light by using an amplifying medium doped with a rare earth ion (for example, an optical fiber doped with a rare earth ion) and an excitation light source. The optical multiplexer 33 allocates the signal light obtained by DP-QPSK to the short wavelength side of the amplification band of the optical amplifier 32 and the signal light obtained by a non polarization-multiplexed signal to the long wavelength side of the amplification band. In this state, the optical multiplexer 33 multiplexes the signal light obtained by DP-QPSK and the signal light obtained by a non polarization-multiplexed signal, and then outputs the multiplexed signal lights to the optical amplifier 32.

As described above, the optical transmission system according to an embodiment multiplexes the signal light obtained by DP-QPSK and the signal light obtained by non polarization-multiplexed signal in a state in which the signal light obtained by DP-QPSK is allocated to the short wavelength side of the amplification band of the optical amplifier 32 and the signal light obtained by a non polarization-multiplexed signal to the long wavelength side. Because the short wavelength side band of the amplification band has PDG, gain for a noise component of a signal light may be larger than gain for the signal light depending on the status of polarized waves of the signal light. However, because the signal light obtained by DP-QPSK includes two polarized waves that are orthogonal to each other, the gain for the signal light and the gain for the noise component are even, thereby reducing the likelihood of and/or preventing a situation from occurring where only the gain for the noise component is large. Therefore, the effect of PDG may be reduced, which reduces the likelihood of and/or prevents the deterioration of the transmission quality. In addition, since a guard band is not used, the amplification band can be effectively utilized.

Figure 2:
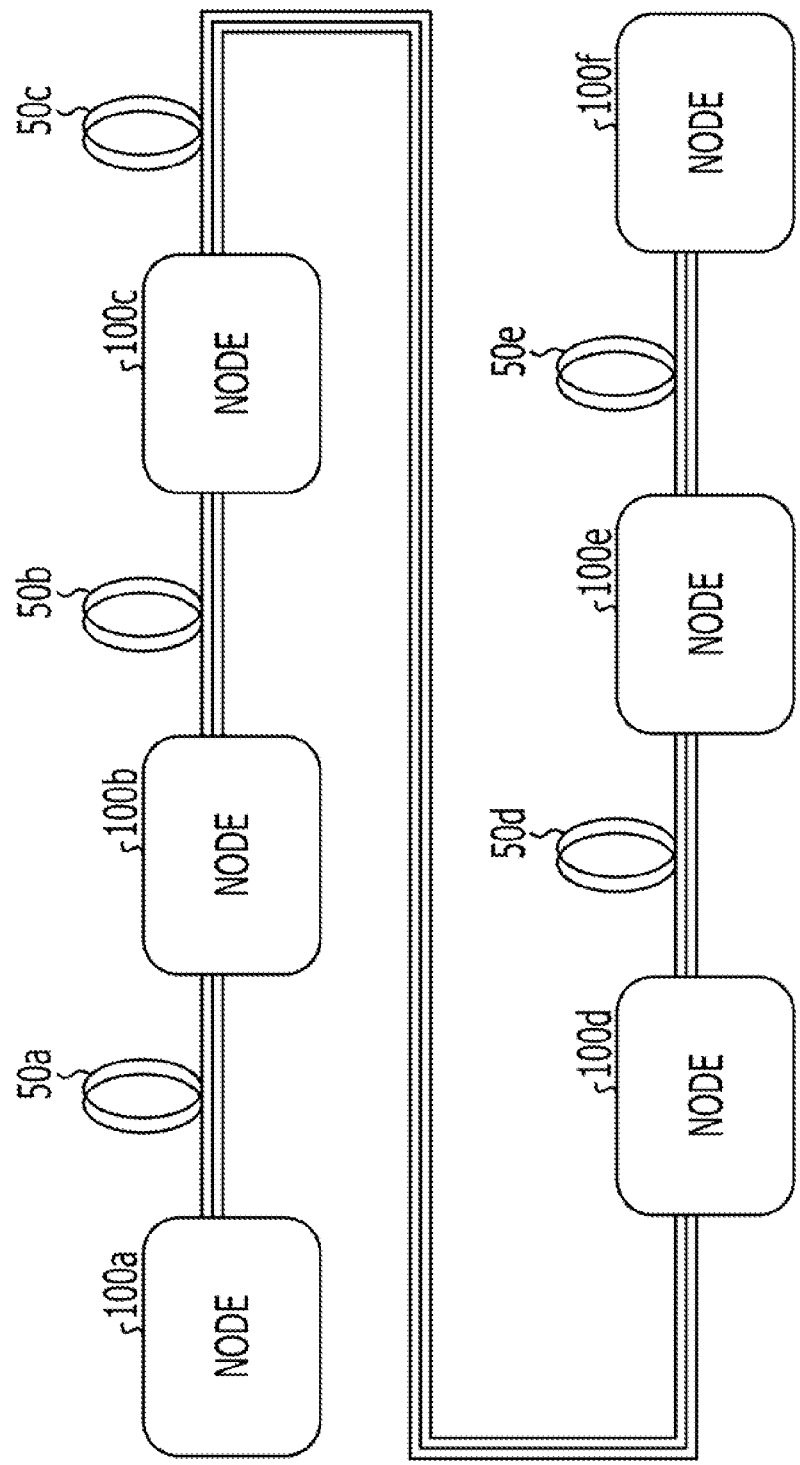
FIG. 2 is a diagram illustrating the configuration of a WDM transmission system according to an embodiment.

Next, the configuration of a WDM transmission system according to an embodiment will be described. FIG. 2 is a diagram illustrating the configuration of the WDM transmission system according to an embodiment. As illustrated in FIG. 2, the WDM transmission system has a plurality of nodes 100a to 100f. The nodes 100 are optically connected to one another by transmission paths 50 such as optical fibers. More specifically, the node 100a and the node 100b are optically connected to each other by a transmission path 50a, and the node 100b and the node 100c are optically connected to each other by a transmission path 50b. In addition, the node 100c and the node 100d are optically connected to each other by a transmission path 50c, the node 100d and the node 100e are optically connected to each other by a transmission path 50d, and the node 100e and the node 100f are optically connected to each other by a transmission path 50e.

Figure 3:
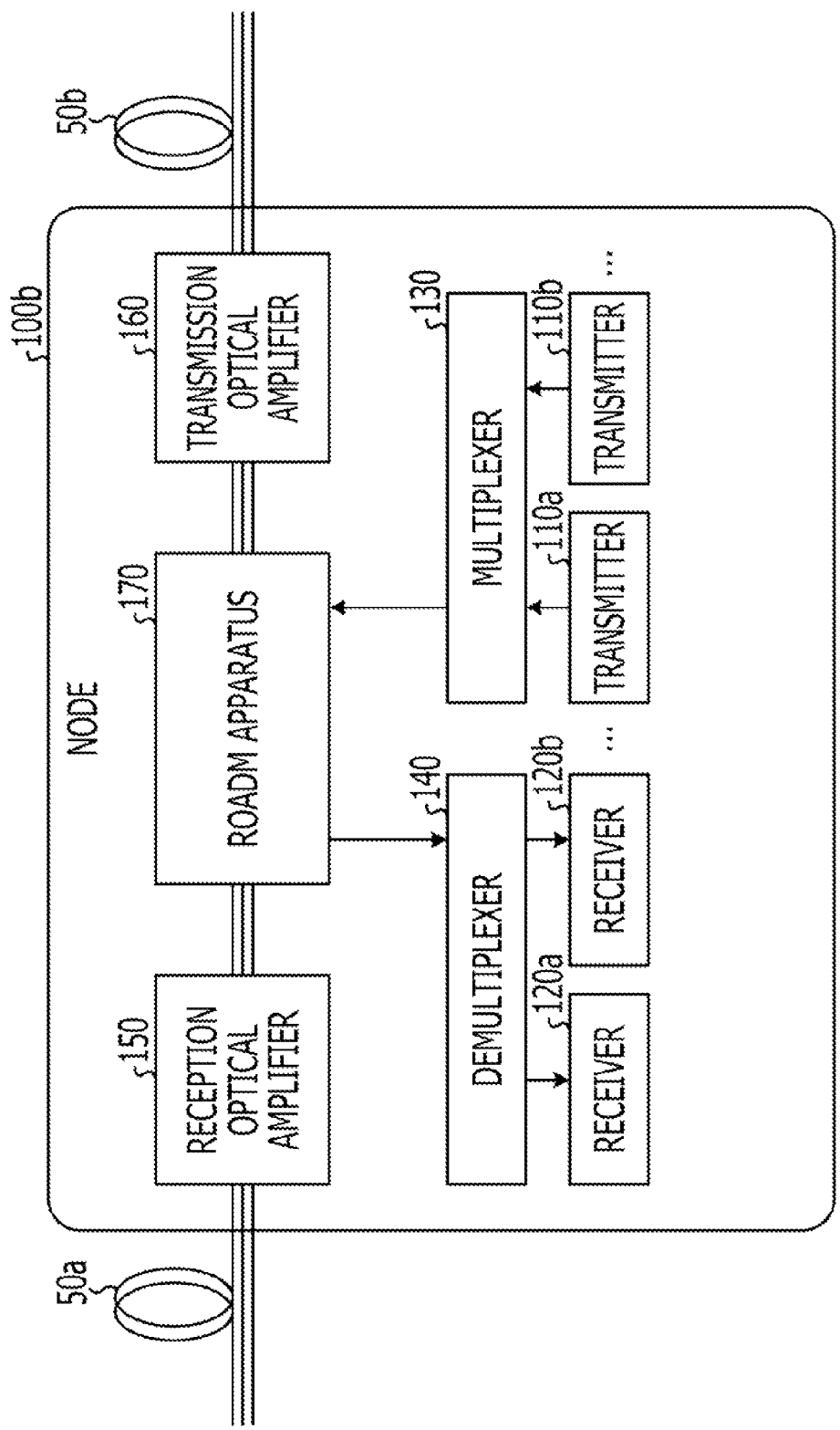
FIG. 3 is a diagram illustrating the configuration of a node according to an embodiment.

Next, the configuration of the nodes 100 illustrated in FIG. 2 will be described. Here, the configuration of the node 100b will be described as an example. The configuration of the nodes 100a and 100c to 100f is the same as that of the node 100b. FIG. 3 is a diagram illustrating the configuration of the node 100b according to an embodiment. As illustrated in FIG. 3, the node 100b has transmitters 110a and 110b, receivers 120a and 120b, an optical multiplexer 130, and a demultiplexer 140. In addition, the node 100b also has a reception optical amplifier 150, a transmission optical amplifier 160, and a reconfigurable optical add/drop multiplexer (ROADM) apparatus 170.

Although the transmitters 110a and 110b are illustrated in FIG. 3 for convenience of description, the node 100b may further include another transmitter. In addition, although the receivers 120a and 120b are illustrated in FIG. 3, the node 100b may further include another receiver.

The transmitters 110a and 110b convert electrical signals to signal lights and output the signal lights obtained by the conversion to the optical multiplexer 130. Methods for modulating a signal light adopted by the transmitters 110a and 110b include the OOK modulation method, a DPSK modulation method, a DQPSK modulation method, and the DP-QPSK modulation method. The receivers 120a and 120b convert signal lights to electrical signals and output the electrical signals obtained by the conversion to an external apparatus.

The optical multiplexer 130 multiplexes the signal lights input from the transmitters 110a and 110b and outputs the multiplexed signal lights to the ROADM apparatus 170. Here, when multiplexing the signal lights, the optical multiplexer 130 allocates a DP-QPSK signal to the short wavelength side of the amplification band of the optical amplifier and a non polarization-multiplexed signal to the long wavelength side. A DP-QPSK signal corresponds to, for example, a signal light modulated by the DP-QPSK modulation method. A non polarization-multiplexed signal corresponds to, for example, a signal light modulated by the OOK modulation method, the DPSK modulation method, or the DQPSK modulation method.

The multiplexed signals are input to the demultiplexer 140 by the ROADM apparatus 170, and the demultiplexer 140 demultiplexes these multiplexed signal lights in terms of the wavelength. The demultiplexer 140 then outputs the demultiplexed signal lights to the receivers 120a and 120b.

The reception optical amplifier 150 amplifies a signal light attenuated by the transmission path 50a and the like and outputs the amplified signal light to the ROADM apparatus 170. The reception optical amplifier 150 is, for example, an Erbium Doped Fiber Amplifier (EDFA).

The transmission optical amplifier 160 amplifies a signal light attenuated by the optical multiplexer 130, the ROADM apparatus 170, and the like and outputs the amplified signal light to the transmission path 50b. The transmission optical amplifier 160 is, for example, an EDFA.

The ROADM apparatus 170 executes a process for adding a signal light having an arbitrary wavelength and a process for extracting a signal light having an arbitrary wavelength from an original signal light. For example, a signal light is input to the ROADM apparatus 170 by the reception optical amplifier 150, and the ROADM apparatus 170 extracts a signal light having an arbitrary wavelength from the signal light and then outputs the extracted signal light to the demultiplexer 140. In addition, a signal light is also input to the ROADM apparatus 170 by the optical multiplexer 130, and the ROADM apparatus 170 adds the signal light to a signal light input from the reception optical amplifier 150 and then outputs the signal lights to the transmission optical amplifier 160.

It is to be noted that if the ROADM apparatus 170 does not execute the process for adding a signal light and the process for extracting a signal light, the ROADM apparatus 170 directly outputs the signal light input from the reception optical amplifier 150 to the transmission optical amplifier 160.

In general, the transmission distance per span is about 100 km. Therefore, in order to transmit a signal light over a distance of several hundred to several thousand kilometers, the signal light is relayed through a plurality of nodes. For example, by utilizing the ROADM apparatus 170, a signal light having an arbitrary wavelength can be added or extracted in accordance with the demand.

Next, increasing of the number of wavelengths will be described. Here, conditions under which the WDM transmission system is introduced are referred to as Conditions 1 and 2 as an example. First, Condition 1 refers to a condition where data communication between the node 100a and the node 100f is performed with a signal light of about 10 Gbps. In this case, a transmitter 110 that performs data communication with a signal light of 10 Gbps is arranged at the node 100a, and a receiver 120 that performs data communication with a signal light of 10 Gbps is arranged at the node 100f. A wavelength $\lambda 1$ of a signal light that is transmitted and received between the node 100a and the node 100f is then set to the long wavelength side of the amplification band of the optical amplifier. Here, a signal light output from the transmitter 110 of the node 100a is a non polarization-multiplexed signal.

Secondly, Condition 2 refers to a condition where data communication between the node 100b and the node 100d is performed with a signal light of about 100 Gbps. In this case, a transmitter 110 that performs data communication with a signal light of 100 Gbps is arranged at the node 100b, and a receiver 120 that performs data communication with a signal light of 100 Gbps is arranged at the node 100d. A wavelength $\lambda 2$ of a signal light that is transmitted and received between the node 100b and the node 100d is then set to the short wavelength side of the amplification band of the optical amplifier. Here, a signal light output from the transmitter 110 of the node 100b is a DP-QPSK signal.

Figure 4:
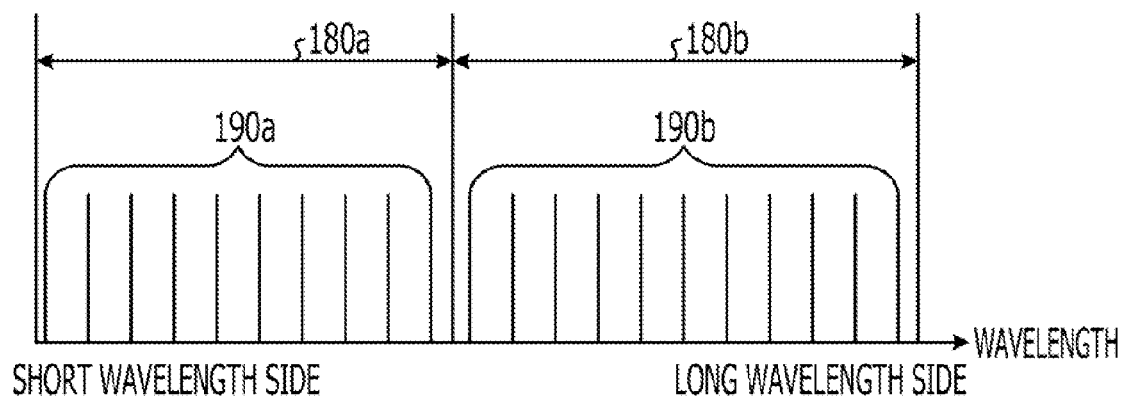
FIG. 4 is a diagram illustrating a wavelength band of a signal light transmitted by the WDM transmission system according to an embodiment.

Next, a wavelength band used in a case in which the WDM transmission system transmits a signal light under the above-described Conditions 1 and 2 will be described. FIG. 4 is a diagram illustrating a wavelength band of the signal light transmitted by the WDM transmission system according to an embodiment. The horizontal axis of FIG. 4 represents the wavelength, and the short wavelength side is on the left and the long wavelength side is on the right in FIG. 4. As illustrated in FIG. 4, the wavelength band includes a first band 180a and a second band 180b. The wavelength band including the first band 180a and the second band 180b corresponds to the amplification band of the optical amplifier. In addition, the first band 180a is located on a shorter wavelength side than the second band 180b. In the WDM transmission system according to an embodiment, a DP-QPSK signal 190a is arranged in the first band 180a, and a non polarization-multiplexed signal 190b is arranged in the second band 180b.

As has been described above, the WDM transmission system according to an embodiment causes the short wavelength side, where PHB occurs, of the amplification band of the optical amplifier to transmit a signal light obtained by DP-QPSK and causes the long wavelength side to transmit a signal light obtained by a non polarization-multiplexed signal. Therefore, the effect of the difference in gain (for example, the difference in gain between a signal light obtained by DP-QPSK and ASE light), which depends on polarized waves, can be successfully reduced, thereby reducing the likelihood of and/or preventing the deterioration of the transmission quality. That is, since the gain for the signal light obtained by DP-QPSK and that for the ASE light are almost the same in the PHB band, the deterioration of an optical signal-to-noise ratio (OSNR) can be suppressed.

Figure 5:
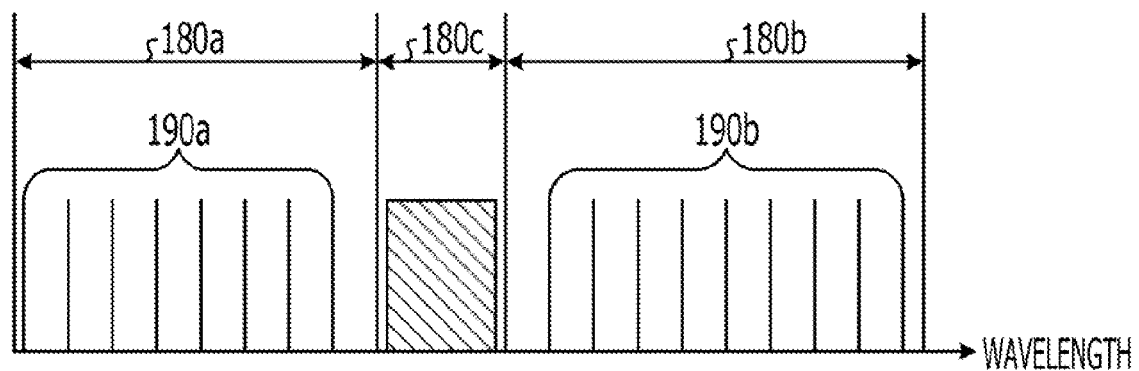
FIG. 5 is a diagram illustrating a guard band set by the WDM transmission system according to an embodiment.

It is to be noted that, in the WDM transmission system according to an embodiment, a guard band may be set between the first band 180a and the second band 180b. FIG. 5 is a diagram illustrating a guard band set for the WDM transmission system according to an embodiment. The horizontal axis of FIG. 5 represents the wavelength. As illustrated in FIG. 5, a guard band 180c is set between the first band 180a and the second band 180b.

Even if, for example, a signal light obtained by the phase modulation method is allocated to the first band 180a and a signal light obtained by the OOK modulation method is allocated to the second band 180b, cross-phase modulation (XPM) can be reduced by setting the guard band 180c. It is to be noted that, in the WDM transmission system, even if the modulation methods adopted for a signal light allocated to the first band 180a and a signal light allocated to the second band 180b are the same, when the transmission speeds of the signal lights are different, the guard band 180c is set. In particular, the XPM caused by wavelength-division multiplexing of a low-speed OOK-modulated signal light and a high-speed phase-modulated signal light results in a significant deterioration of the transmission quality of the high-speed phase-modulated signal light.

Figure 6:
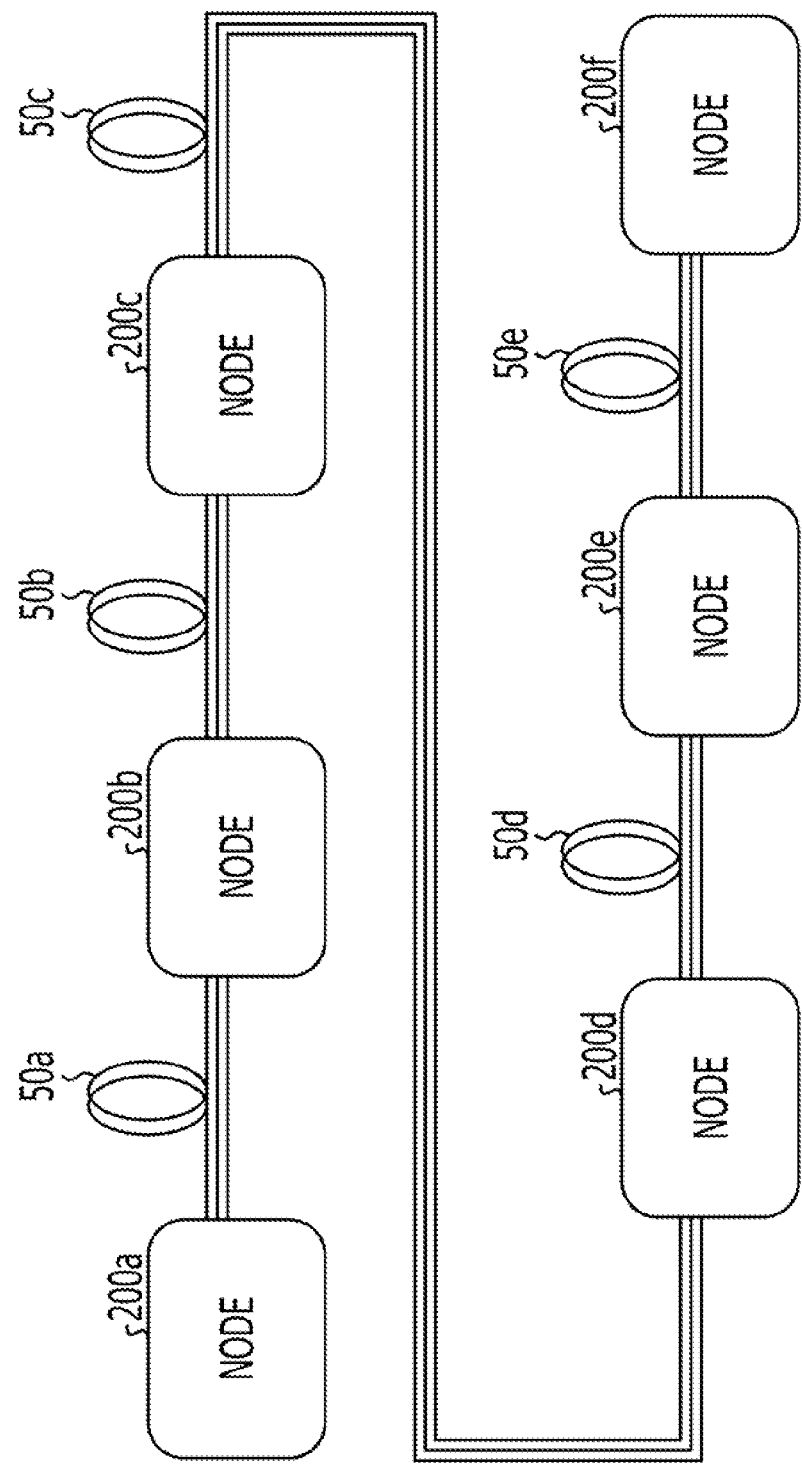
FIG. 6 is a diagram illustrating the configuration of a WDM transmission system according to an embodiment.

Next, the configuration of a WDM transmission system according to an embodiment will be described. FIG. 6 is a diagram illustrating the configuration of the WDM transmission system according to an embodiment. As illustrated in FIG. 6, the WDM transmission system has a plurality of nodes 200a to 200f. The nodes 200 are optically connected to one another by transmission paths 50 such as optical fibers. More specifically, the node 200a and the node 200b are optically connected to each other by a transmission path 50a, and the node 200b and the node 200c are optically connected to each other by a transmission path 50b. In addition, the node 200c and the node 200d are optically connected to each other by a transmission path 50c, the node 200d and the node 200e are optically connected to each other by a transmission path 50d, and the node 200e and the node 200f are optically connected to each other by a transmission path 50e.

Figure 7:
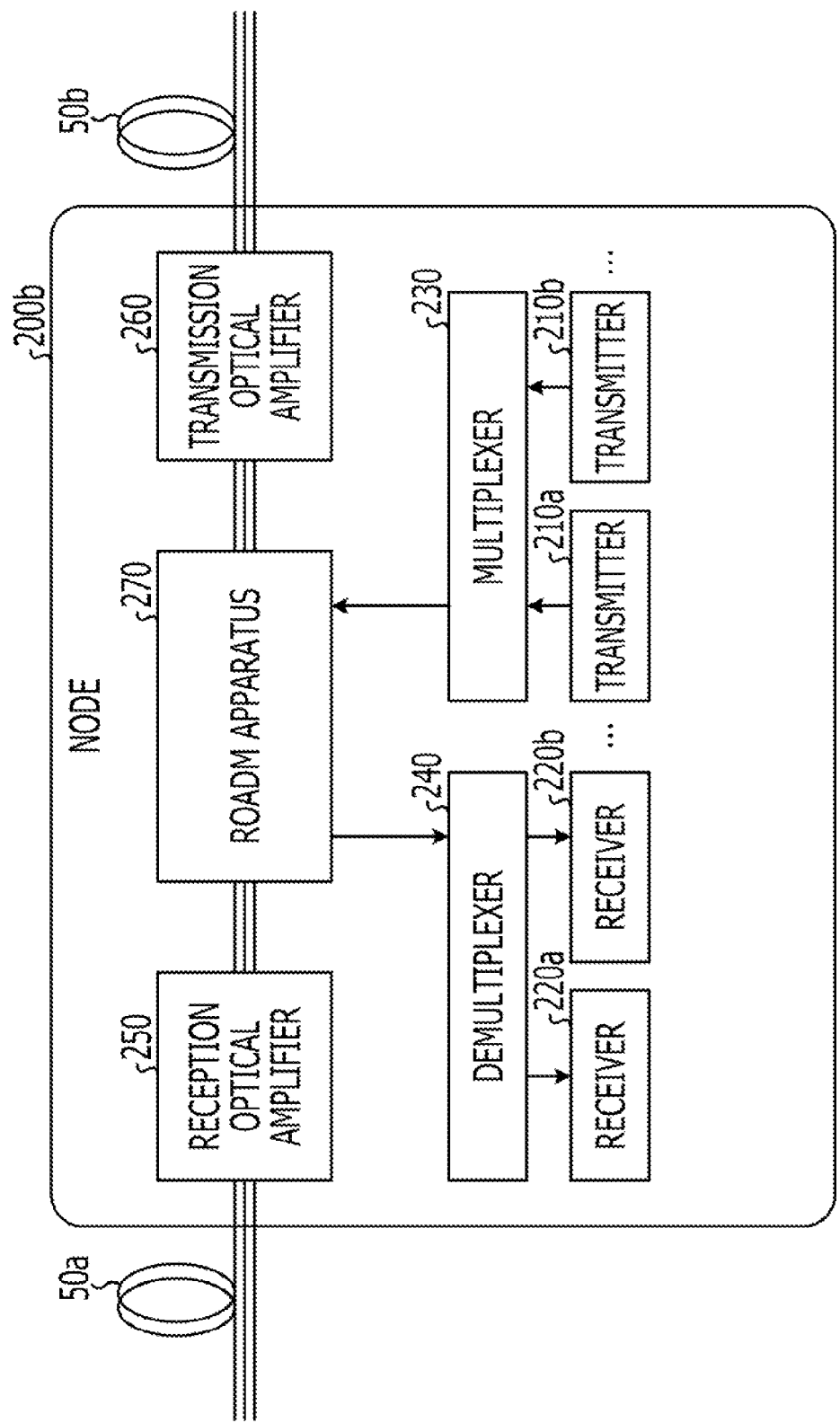
FIG. 7 is a diagram illustrating the configuration of a node according to an embodiment.

Next, the configuration of the nodes 200 illustrated in FIG. 6 will be described. Here, the configuration of the node 200b will be described as an example. The configuration of the nodes 200a and 200c to 200f is the same as that of the node 200b. FIG. 7 is a diagram illustrating the configuration of the node 200b according to an embodiment. As illustrated in FIG. 7, the node 200b has transmitters 210a and 210b, receivers 220a and 220b, an optical multiplexer 230, and a demultiplexer 240. In addition, the node 200b also has a reception optical amplifier 250, a transmission optical amplifier 260, and an ROADM apparatus 270.

In FIG. 7, the description of the transmitters 210a and 210b, the receivers 220a and 220b, and the demultiplexer 240 is the same as that of the transmitters 110a and 110b, the receivers 120a and 120b, and the demultiplexer 140 according to an embodiment, respectively. In addition, the description of the reception optical amplifier 250, the transmission optical amplifier 260, and the ROADM apparatus 270 is the same as that of the reception optical amplifier 150, the transmission optical amplifier 160, and the ROADM apparatus 170 according to an embodiment, respectively.

The optical multiplexer 230 multiplexes signal lights input from the transmitters 210a and 210b and outputs the multiplexed signal lights to the ROADM apparatus 270. Here, when multiplexing the signal lights, the optical multiplexer 230 allocates a DP-QPSK signal to the short wavelength side of the amplification band of the optical amplifier and a non polarization-multiplexed signal to the long wavelength side.

When allocating a plurality of DP-QPSK signals, the optical multiplexer 230 allocates the DP-QPSK signals sequentially from the short wavelength side toward the long wavelength side. In this case, the allocation need not be performed in sequential order from the short wavelength side toward the long wavelength side. That is, even if the sequence of wavelength allocation is out of order from a chronological point of view, no significant issues occur. In addition, when allocating a plurality of non polarization-multiplexed signals, the optical multiplexer 230 allocates the non polarization-multiplexed signals from the long wavelength side toward the short wavelength side.

Next, increasing of the number of wavelengths will be described. Here, conditions under which the WDM transmission system is introduced are referred to as Conditions 1 to 4 as an example. First, Condition 1 refers to a condition where data communication between the node 200a and the node 200f is performed with a signal light of 10 Gbps. In this case, a transmitter 210 that performs data communication with a signal light of 10 Gbps is arranged at the node 200a, and a receiver 220 that performs data communication with a signal light of 10 Gbps is arranged at the node 200f. A wavelength λ1 of a signal light that is transmitted and received between the node 200a and the node 200f is then set to the long wavelength side of the amplification band of the optical amplifier. Here, a signal light output from the transmitter 210 of the node 200a is a non polarization-multiplexed signal.

Secondly, Condition 2 refers to a condition where data communication between the node 200b and the node 200d is performed with a signal light of 10 Gbps. In this case, a transmitter 210 that performs data communication with a signal light of 10 Gbps is arranged at the node 200b, and a receiver 220 that performs data communication with a signal light of 10 Gbps is arranged at the node 200d. A wavelength λ2 of a signal light that is transmitted and received between the node 200b and the node 200d is then set to the long wavelength side of the amplification band of the optical amplifier. However, the wavelength λ2 is set to a shorter wavelength side than the wavelength λ1. Here, a signal light output from the transmitter 210 of the node 200b is a non polarization-multiplexed signal.

Thirdly, Condition 3 refers to a condition where data communication between the node 200c and the node 200e is performed with a signal light of 100 Gbps. In this case, a transmitter 210 that performs data communication with a signal light of 100 Gbps is arranged at the node 200c, and a receiver 220 that performs data communication with a signal light of 100 Gbps is arranged at the node 200e. A wavelength λ3 of a signal light that is transmitted and received between the node 200c and the node 200e is then set to the short wavelength side of the amplification band of the optical amplifier. Here, a signal light output from the transmitter 210 of the node 200c is a DP-QPSK signal.

Fourthly, Condition 4 refers to a condition where data communication between the node 200d and the node 200f is performed with a signal light of 100 Gbps. In this case, a transmitter 210 that performs data communication with a signal light of 100 Gbps is arranged at the node 200d, and a receiver 220 that performs data communication with a signal light of 100 Gbps is arranged at the node 200f. A wavelength λ4 of a signal light that is transmitted and received between the node 200d and the node 200f is then set to the short wavelength side of the amplification band of the optical amplifier. However, the wavelength λ4 is set to a longer wavelength side than the wavelength λ3. Here, a signal light output from the transmitter 210 of the node 200d is a DP-QPSK signal.

Figure 8:
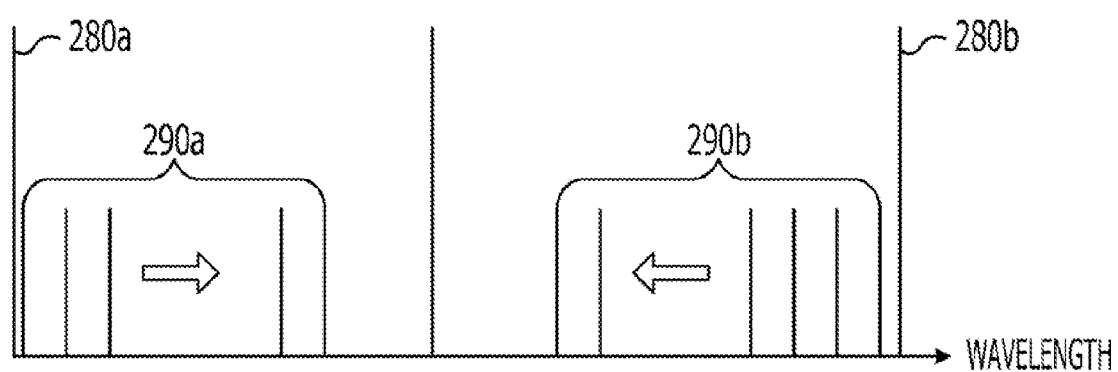
FIG. 8 is a diagram illustrating a wavelength band of a signal light transmitted by the WDM transmission system according to an embodiment.

Next, a wavelength band used in a case in which the WDM transmission system transmits a signal light under the above-described Conditions 1 to 4 will be described. FIG. 8 is a diagram illustrating a wavelength band of the signal light transmitted by the WDM transmission system according to an embodiment. The horizontal axis of FIG. 8 represents the wavelength. As illustrated in FIG. 8, if a DP-QPSK signal 290a is expanded in the WDM transmission system, the DP-QPSK signal is expanded from a short wavelength side 280a toward a long wavelength side 280b. In contrast, if a non polarization-multiplexed signal 290b is expanded, the non polarization-multiplexed signal 290b is expanded from the long wavelength side 280b toward the short wavelength side 280a.

As has been described above, the WDM transmission system according to an embodiment causes the short wavelength side of the amplification band of the optical amplifier to transmit a DP-QPSK signal and causes the long wavelength side to transmit a non polarization-multiplexed signal. In addition, when expanding a DP-QPSK signal, the WDM transmission system increases the number of wavelengths of the DP-QPSK signal from the short wavelength side toward the long wavelength side. Furthermore, when expanding a non polarization-multiplexed signal, the WDM transmission system increases the number of wavelengths of the non polarization-multiplexed signals from the long wavelength side toward the short wavelength side. Therefore, the polarization status within a spectrum hole becomes nonuniform even on the short wavelength side, which has a large PDG, thereby successfully reducing the PDG. In addition, since a signal light modulated by various modulation methods can be easily expanded in accordance with the demand, the amplification band of the optical amplifier can be effectively utilized.

Figure 9:
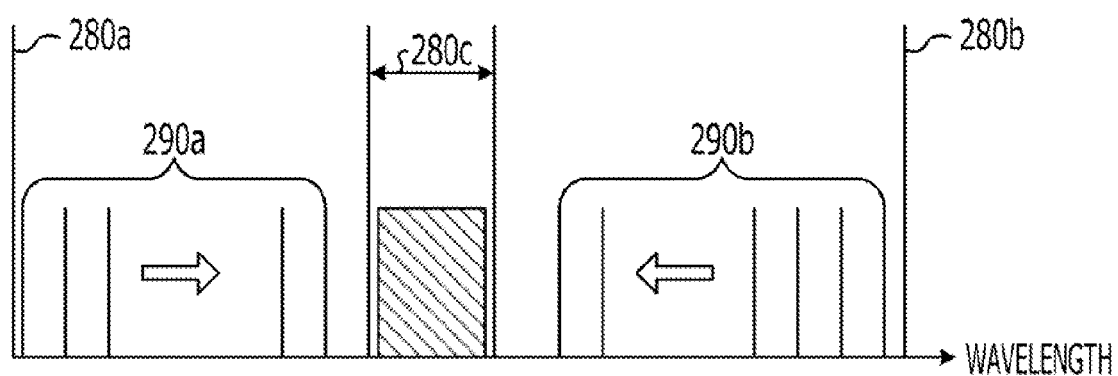
FIG. 9 is a diagram illustrating a guard band set by the WDM transmission system according to an embodiment.

It is to be noted that, in the WDM transmission system according to an embodiment, a guard band may be set between the short wavelength side band to which a DP-QPSK signal is allocated and the long wavelength side band to which a non polarization-multiplexed signal is allocated. FIG. 9 is a diagram illustrating a guard band set for the WDM transmission system according to an embodiment. The horizontal axis of FIG. 9 represents the wavelength. As illustrated in FIG. 9, a guard band 280c is set between the band to which the DP-QPSK signal 290a is allocated and the band to which the non polarization-multiplexed signal 290b is allocated. As illustrated in FIG. 9, by expanding the DP-QPSK signal from the short wavelength side 280a toward the long wavelength side 280b and by expanding the non polarization-multiplexed signal from the long wavelength side 280b toward the short wavelength side 280a, the amplification band of the optical amplifier including the guard band can be effectively utilized.

Figure 10:
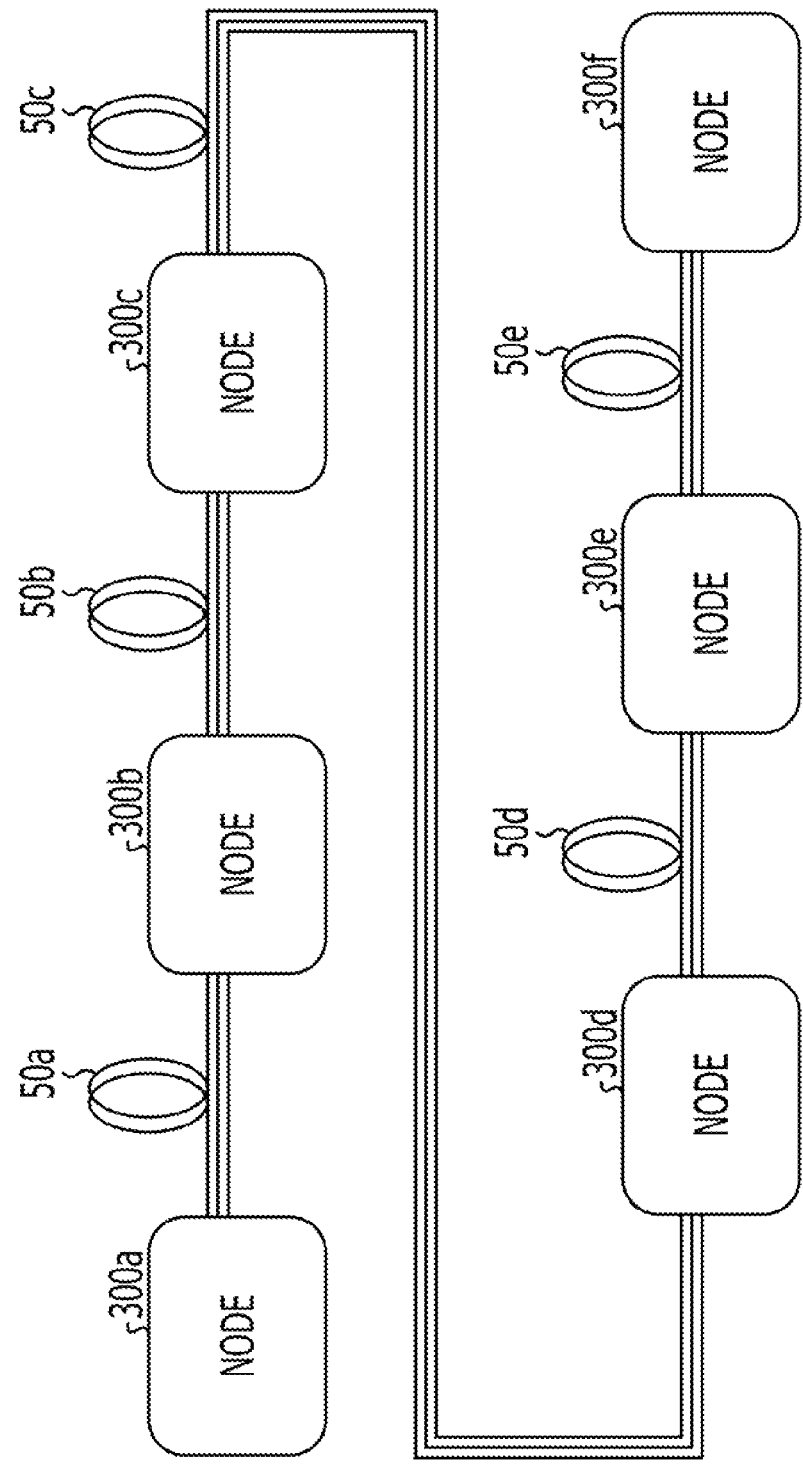
FIG. 10 is a diagram illustrating the configuration of a WDM transmission system according to an embodiment.

Next, the configuration of a WDM transmission system according to an embodiment will be described. FIG. 10 is a diagram illustrating the configuration of the WDM transmission system according to an embodiment. As illustrated in FIG. 10, the WDM transmission system has a plurality of nodes 300a to 300f. The nodes 300 are optically connected to one another by transmission paths 50 such as optical fibers. More specifically, the node 300a and the node 300b are optically connected to each other by a transmission path 50a, and the node 300b and the node 300c are optically connected to each other by a transmission path 50b. In addition, the node 300c and the node 300d are optically connected to each other by a transmission path 50c, the node 300d and the node 300e are optically connected to each other by a transmission path 50d, and the node 300e and the node 300f are optically connected to each other by a transmission path 50e.

Figure 11:
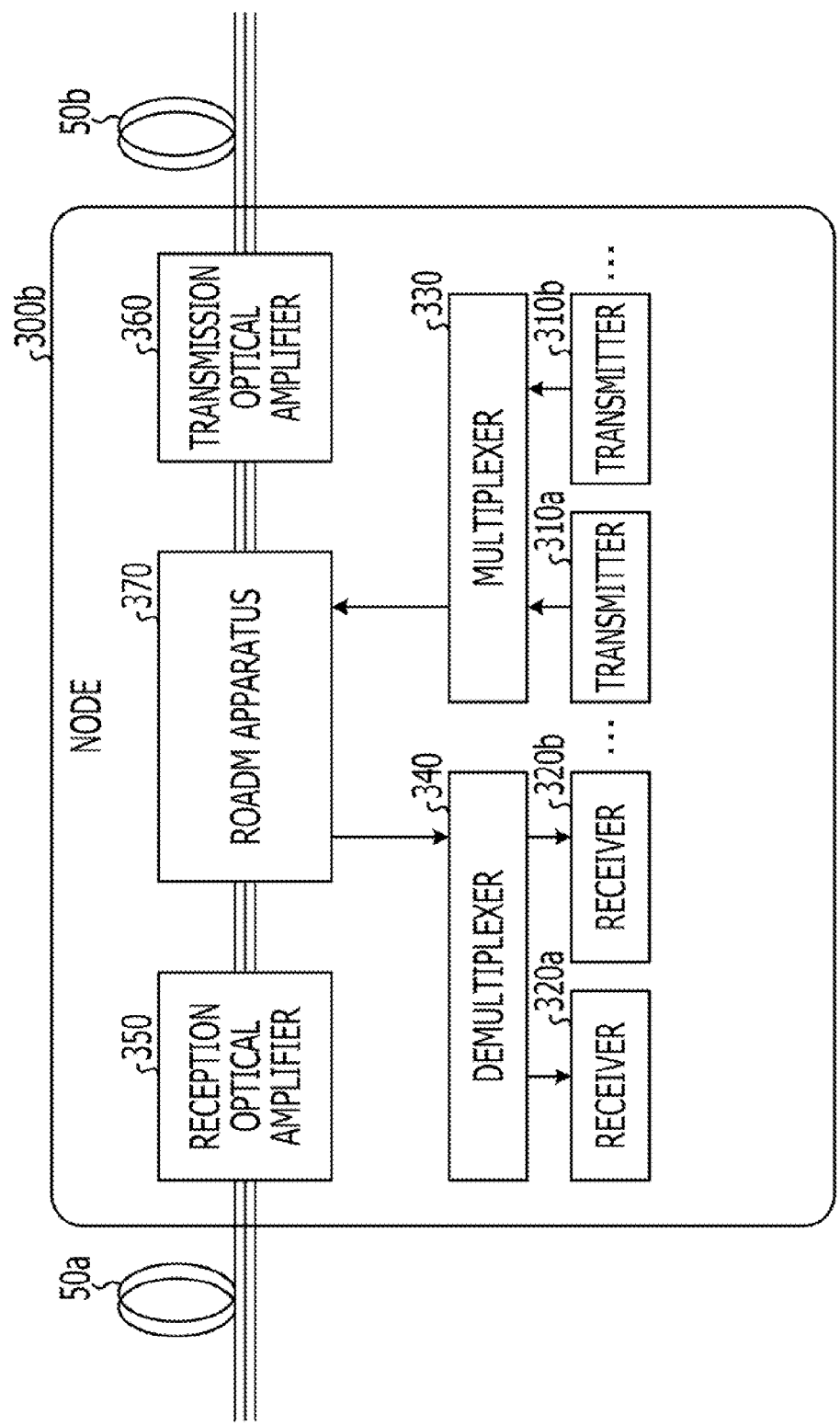
FIG. 11 is a diagram illustrating the configuration of a node according to an embodiment.

Next, the configuration of the nodes 300 illustrated in FIG. 10 will be described. Here, the configuration of the node 300b will be described as an example. The configuration of the nodes 300a and 300c to 300f is the same as that of the node 300b. FIG. 11 is a diagram illustrating the configuration of the node 300b according to an embodiment. As illustrated in FIG. 10, the node 300b has transmitters 310a and 310b, receivers 320a and 320b, an optical multiplexer 330, and a demultiplexer 340. In addition, the node 300b also has a reception optical amplifier 350, a transmission optical amplifier 360, and an ROADM apparatus 370.

In FIG. 11, the description of the transmitters 310a and 310b, the receivers 320a and 320b, and the demultiplexer 340 is the same as that of the transmitters 110a and 110b, the receivers 120a and 120b, and the demultiplexer 140 according to an embodiment, respectively. In addition, the description of the reception optical amplifier 350, the transmission optical amplifier 360, and the ROADM apparatus 370 is the same as that of the reception optical amplifier 150, the transmission optical amplifier 160, and the ROADM apparatus 170 according to an embodiment, respectively.

The optical multiplexer 330 multiplexes signal lights input from the transmitters 310a and 310b and outputs the multiplexed signal lights to the ROADM apparatus 370. Here, when multiplexing the signal lights, the optical multiplexer 330 allocates a DP-QPSK signal to the short wavelength side of the amplification band of the optical amplifier and a non polarization-multiplexed signal to the long wavelength side.

Furthermore, when a non polarization-multiplexed signal includes a signal light modulated by the phase modulation method and a signal light modulated by the OOK modulation method, the optical multiplexer 330 restricts bands to which the signals are allocated. From among non polarization-multiplexed signals, a signal light modulated by the phase modulation method is referred to as a "phase-modulated signal obtained by a non polarization-multiplexed signal" herein. In addition, from among non polarization-multiplexed signals, a signal light modulated by the OOK modulation method is referred to as an "OOK-modulated signal obtained by a non polarization-multiplexed signal".

More specifically, the optical multiplexer 330 sets the phase-modulated signal obtained by a non polarization-multiplexed signal to a shorter wave length side than the OOK-modulated signal obtained by a non polarization-multiplexed signal. However, the phase-modulated signal obtained by a non polarization-multiplexed signal is set to a longer wavelength side than a DP-QPSK signal.

Next, increasing of the number of wavelengths will be described. Here, conditions under which the WDM transmission system is introduced are referred to as Conditions 1 to 3 as an example. First, Condition 1 refers to a condition where data communication between the node 300a and the node 300f is performed with a signal light of 10 Gbps. In this case, a transmitter 310 that performs data communication with a signal light of 10 Gbps is arranged at the node 300a, and a receiver 320 that performs data communication with a signal light of 10 Gbps is arranged at the node 300f. A wavelength $\lambda 1$ of a signal light that is transmitted and received between the node 300a and the node 300f is then set to the long wavelength side of the amplification band of the optical amplifier. Here, a signal light output from the transmitter 310 of the node 300a is an OOK-modulated signal as a non polarization-multiplexed signal.

Secondly, Condition 2 refers to a condition where data communication between the node 300b and the node 300d is performed with a signal light of 100 Gbps. In this case, a transmitter 310 that performs data communication with a signal light of 100 Gbps is arranged at the node 300b, and a receiver 320 that performs data communication with a signal light of 100 Gbps is arranged at the node 300d. A wavelength $\lambda 2$ of a signal light that is transmitted and received between the node 300b and the node 300d is then set to the short wavelength side of the amplification band of the optical amplifier. Here, a signal light output from the transmitter 310 of the node 300b is a DP-QPSK signal.

Thirdly, Condition 3 refers to a condition where data communication between the node 300c and the node 300e is performed with a signal light of 40 Gbps. In this case, a transmitter 310 that performs data communication with a signal light of 40 Gbps is arranged at the node 300c, and a receiver 320 that performs data communication with a signal light of 40 Gbps is arranged at the node 300e. A wavelength $\lambda 3$ of a signal light that is transmitted and received between the node 300c and the node 300e is then set to the short wavelength side of the amplification band of the optical amplifier. However, the wavelength $\lambda 3$ is set to a longer wavelength side than the wavelength $\lambda 2$. Here, a signal light output from the transmitter 310 of the node 300c is a phase-modulated signal obtained by a non polarization-multiplexed signal.

Figure 12:
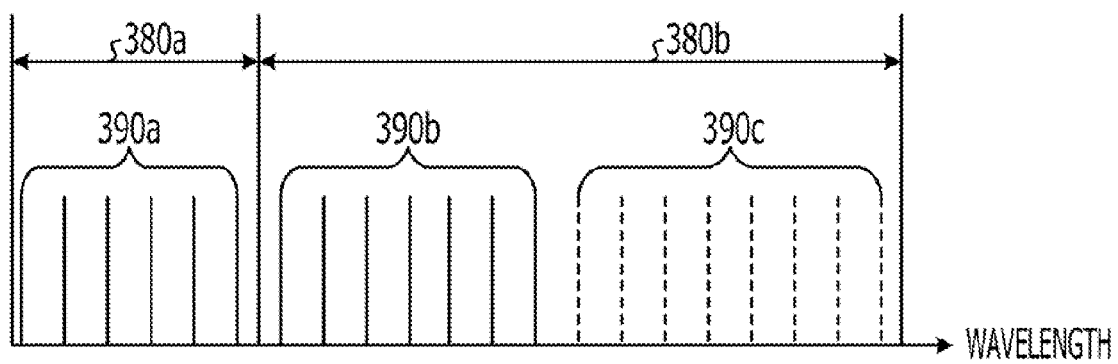
FIG. 12 is a diagram illustrating a wavelength band of a signal light transmitted by the WDM transmission system according to an embodiment.

Next, a wavelength band used in a case in which the WDM transmission system transmits a signal light under the above-described Conditions 1 to 3 will be described. FIG. 12 is a diagram illustrating a wavelength band of the signal light transmitted by the WDM transmission system according to an embodiment. The horizontal axis of FIG. 12 represents the wavelength. As illustrated in FIG. 12, the wavelength band used by the WDM transmission system includes a first band 380a and a second band 380b. The wavelength band including the first band 380a and the second band 380b corresponds to the amplification band of the optical amplifier. In addition, the first band 380a is located on a shorter wavelength side than the second band 380b.

As illustrated in FIG. 12, in the WDM transmission system according to an embodiment, a DP-QPSK signal 390a is arranged in the first band 380a, and a phase-modulated signal 390b obtained by a non polarization-multiplexed signal and an OOK-modulated signal 390c obtained by a non polarization-multiplexed signal are arranged in the second band 380b. It is to be noted that, compared to the OOK-modulated signal 390c obtained by non polarization-multiplexed signal, the phase-modulated signal 390b obtained by a non polarization-multiplexed signal is arranged on a shorter wavelength side.

As has been described above, the WDM transmission system according to an embodiment causes the short wavelength side of the amplification band of the optical amplifier to transmit a DP-QPSK signal and causes the long wavelength side to transmit a phase-modulated signal obtained by a non polarization-multiplexed signal and an OOK-modulated signal obtained by non polarization-multiplexed signal. Therefore, the effect of PDG can be reduced, thereby reducing the likelihood of and/or preventing the deterioration of the transmission quality.

In addition, in the WDM transmission system according to an embodiment, an OOK-modulated signal obtained by a non polarization-multiplexed signal is arranged on the long wavelength side. Therefore, the effect of XPM can be minimized. If the OOK-modulated signal obtained by a non polarization-multiplexed signal were allocated between the phase-modulated signal obtained by DP-QPSK and the phase-modulated signal obtained by a non polarization-multiplexed signal, the phase-modulated signal obtained by DP-QPSK and the phase-modulated signal obtained by a non polarization-multiplexed signal would be affected by the XPM.

Figure 13:
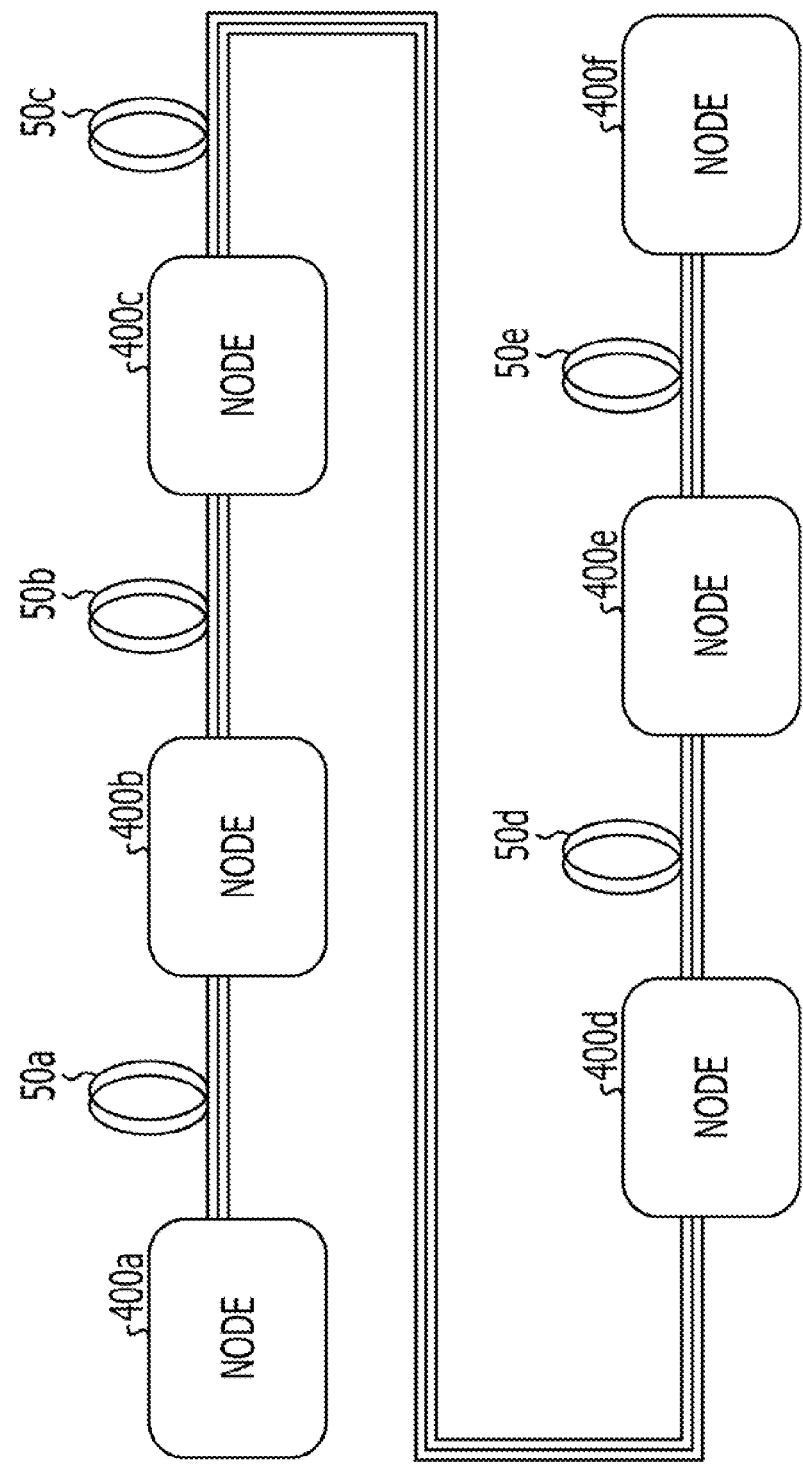
FIG. 13 is a diagram illustrating the configuration of a WDM transmission system according to an embodiment.

Next, the configuration of a WDM transmission system according to an embodiment will be described. FIG. 13 is a diagram illustrating the configuration of the WDM transmission system according to an embodiment. As illustrated in FIG. 13, the WDM transmission system has a plurality of nodes 400a to 400f. The nodes 400 are optically connected to one another by transmission paths 50 such as optical fibers. More specifically, the node 400a and the node 400b are optically connected to each other by a transmission path 50a, and the node 400b and the node 400c are optically connected to each other by a transmission path 50b. In addition, the node 400c and the node 400d are optically connected to each other by a transmission path 50c, the node 400d and the node 400e are optically connected to each other by a transmission path 50d, and the node 400e and the node 400f are optically connected to each other by a transmission path 50e.

Figure 14:
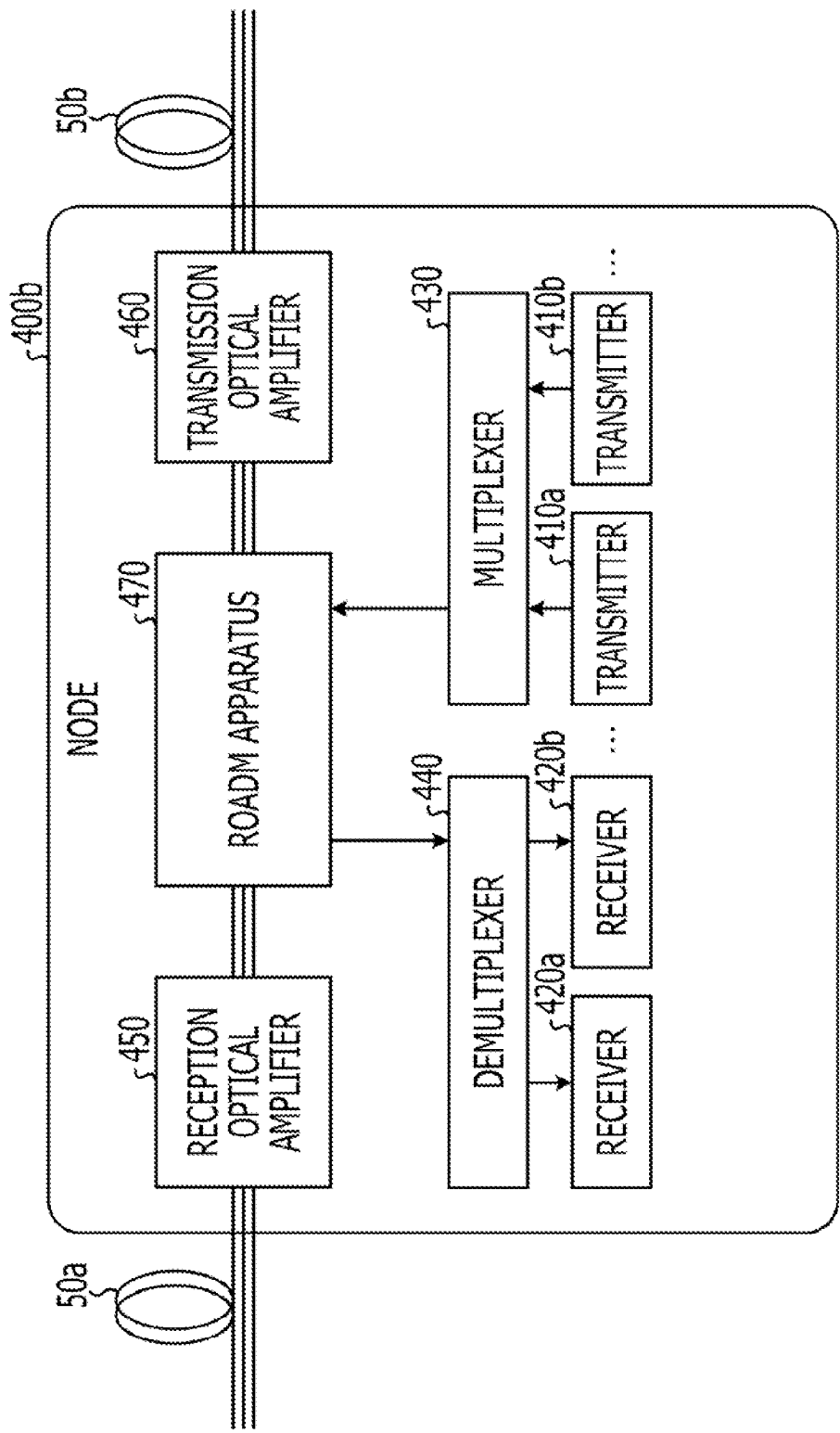
FIG. 14 is a diagram illustrating the configuration of a node according to an embodiment.

Next, the configuration of the nodes 400 illustrated in FIG. 13 will be described. Here, the configuration of the node 400b will be described as an example. The configuration of the nodes 400a and 400c to 400f is the same as that of the node 400b. FIG. 14 is a diagram illustrating the configuration of the node 400b according to an embodiment. As illustrated in FIG. 14, the node 400b has transmitters 410a and 410b, receivers 420a and 420b, an optical multiplexer 430, and a demultiplexer 440. In addition, the node 400b also has a reception optical amplifier 450, a transmission optical amplifier 460, and an ROADM apparatus 470.

In FIG. 14, the description of the transmitters 410a and 410b, the receivers 420a and 420b, and the demultiplexer 440 is the same as that of the transmitters 110a and 110b, the receivers 120a and 120b, and the demultiplexer 140 according to an embodiment, respectively. In addition, the description of the reception optical amplifier 450, the transmission optical amplifier 460, and the ROADM apparatus 470 is the same as that of the reception optical amplifier 150, the transmission optical amplifier 160, and the ROADM apparatus 170 according to an embodiment, respectively.

The optical multiplexer 430 multiplexes signal lights input from the transmitters 410a and 410b and outputs the multiplexed signal lights to the ROADM apparatus 470. Here, when multiplexing the signal lights, the optical multiplexer 430 allocates a phase-modulated signal obtained by a non polarization-multiplexed signal to the short wavelength side of an amplification band of the optical amplifier that extends from a wavelength of 1537 nm to longer wavelengths and an OOK-modulated signal obtained by a non polarization-multiplexed signal to the long wavelength side.

Next, increasing of the number of wavelengths will be described. Here, conditions under which the WDM transmission system is introduced are referred to as Conditions 1 and 2 as an example. First, Condition 1 refers to a condition where data communication between the node 400a and the node 400f is performed with a signal light of 10 Gbps. In this case, a transmitter 410 that performs data communication with a signal light of 10 Gbps is arranged at the node 400a, and a receiver 420 that performs data communication with a signal light of 10 Gbps is arranged at the node 400f. A wavelength $\lambda 1$ of a signal light that is transmitted and received between the node 400a and the node 400f is then set to the long wavelength side of the amplification band of the optical amplifier. Here, a signal light output from the transmitter 410 of the node 400a is an OOK-modulated signal obtained by a non polarization-multiplexed signal.

Secondly, Condition 2 refers to a condition where data communication between the node 400c and the node 400e is performed with a signal light of 40 Gbps. In this case, a transmitter 410 that performs data communication with a signal light of 40 Gbps is arranged at the node 400c, and a receiver 420 that performs data communication with a signal light of 40 Gbps is arranged at the node 400e. A wavelength $\lambda 2$ of a signal light that is transmitted and received between the node 400c and the node 400e is then set to the short wavelength side of the amplification band of the optical amplifier. However, the wavelength $\lambda 2$ is set to a longer wavelength side than a wavelength of 1537 nm. Here, a signal light output from the transmitter 410 of the node 400c is a phase-modulated signal obtained by a non polarization-multiplexed signal.

Figure 15:
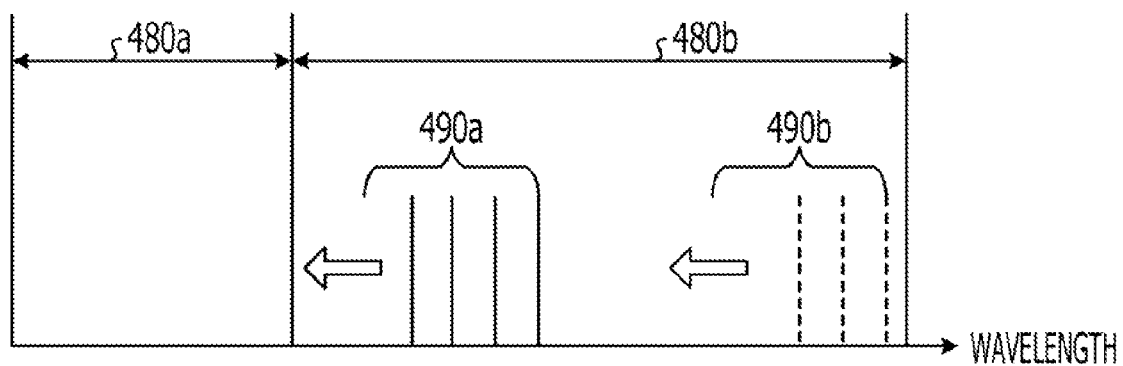
FIG. 15 is a diagram illustrating a wavelength band of a signal light transmitted by the WDM transmission system according to an embodiment.

Next, a wavelength band used in a case in which the WDM transmission system transmits a signal light under the above-described Conditions 1 and 2 will be described. FIG. 15 is a diagram illustrating a wavelength band of the signal light transmitted by the WDM transmission system according to an embodiment. The horizontal axis of FIG. 15 represents the wavelength. As illustrated in FIG. 15, the wavelength band used by the WDM transmission system includes a second band 480b. It is to be noted that a first band 480a is not used in an embodiment. The wavelength band including the first band 480*a* and the second band 480*b* corresponds to the amplification band of the optical amplifier. In addition, the second band 480*b* is located on a longer wavelength side than a wavelength of 1537 nm.

As illustrated in FIG. 15, in the WDM transmission system according to an embodiment, a phase-modulated signal 490*a* obtained by a non polarization-multiplexed signal is arranged on the short wavelength side of the second band 480*b*, and an OOK-modulated signal 490*b* obtained by a non polarization-multiplexed signal is arranged on the long wavelength side of the second band 480*b*. In addition, if the phase-modulated signal 490*a* obtained by a non polarization-multiplexed signal is expanded, the phase-modulated signal 490*a* obtained by a non polarization-multiplexed signal is expanded from the long wavelength side toward the short wavelength side. If the OOK-modulated signal 490*b* obtained by a non polarization-multiplexed signal is expanded, the OOK-modulated signal 490*b* obtained by a non polarization-multiplexed signal is also expanded from the long wavelength side toward the short wavelength side.

It is to be understood that increasing of the number of wavelengths is not limited to the above light. In the second band 480*b*, for example, the phase-modulated signal 490*a* obtained by a non polarization-multiplexed signal may be sequentially expanded from the short wavelength side toward the long wavelength side and the OOK-modulated signal 490*b* obtained by a non polarization-multiplexed signal may be sequentially expanded from the long wavelength side toward the short wavelength side.

As has been described above, the WDM transmission system according to an embodiment causes the short wavelength side of the second band 480*b* to transmit a phase-modulated signal obtained by a non polarization-multiplexed signal and causes the long wavelength side to transmit an OOK-modulated signal obtained by a non polarization-multiplexed signal. Therefore, the effect of PDG can be reduced, thereby reducing the likelihood of and/or preventing the deterioration of the transmission quality. In addition, since a wavelength band located between a wavelength band to which the phase-modulated signal obtained by a non polarization-multiplexed signal is allocated and a wavelength band to which the OOK-modulated signal obtained by a non polarization-multiplexed signal is wide, an issue caused by XMP, that is, deterioration of signals, may be addressed.

With respect to the processes described above, it is to be noted that all or some of the processes that are performed automatically in the above description may be performed manually. In contrast, all or some of the processes that are performed manually in the above description may be performed automatically. Furthermore, the processing procedures, the control procedures, the specific names, and the information including various data and parameters that have been described above or are illustrated in the drawing may be arbitrarily changed, except as otherwise noted.

In addition, the components of each apparatus illustrated in the drawings are conceptualized in terms of the functions thereof, and therefore may not necessarily be physically configured as illustrated. That is, a specific mode in which each apparatus is divided and integrated is not limited to those illustrated in the drawings, and therefore each apparatus may be configured by functionally or physically dividing and integrating the entirety or part thereof into a certain unit in accordance with various types of load and usage. For example, instead of the reception optical amplifier 150 and the transmission optical amplifier 160, a single optical amplifier may be used.

Embodiments 1 to 5 have now been described, and hereinafter there will be described a C band and an L band used in the WDM transmission system. In the C band and the L band, the absorption cross-section and the emission cross-section are larger and the optical power of an EDF in the longitudinal direction is larger on the short wavelength side than on the long wavelength side. In addition, in the C band and the L band, the PDG relative to a polarized wave of a signal light is larger on the short wavelength side than on the long wavelength side.

First, as described in the literature (Carl R. Davidson, "Spectral Dependence of Polarization Hole-Burning" OFC, 2006), a spectral hole generated by a saturation signal light, the gain therefor being polarization dependent, is related to the speed of stimulated emission.

Figure 16:
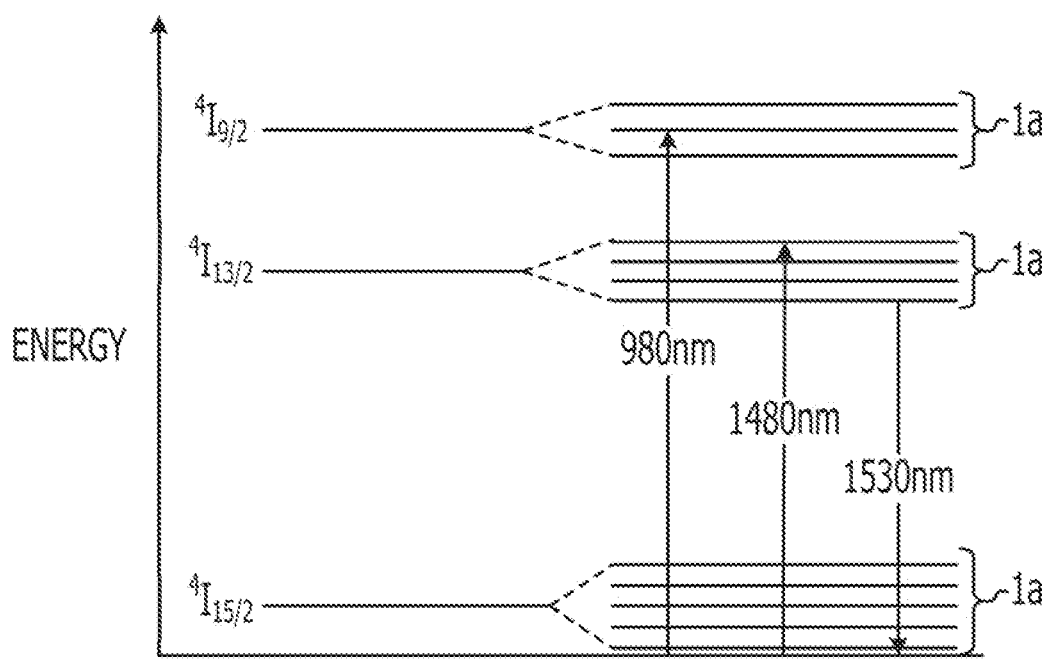
FIG. 16 is a diagram illustrating the energy levels of $Er^{3+}$.

FIG. 16 is a diagram illustrating the energy levels of $Er^{3+}$. Transition between energy levels $^4I_{13/2}$ and $^4I_{15/2}$ caused by stimulated emission is utilized for optical amplification of a 1550 nm region. If a material to which $Er^{3+}$ is added is silica glass, which is the material of an optical fiber, each energy level causes Stark splitting 1*a*. The split energy levels are called "Stark levels". Since each Stark level has a line width of 40 to 100 $cm^{-1}$, the absorption spectrum and the emission spectrum in the 1550 nm region are observed to be continuous with each other.

The density of the Stark levels $Er^{3+}$ follows the Boltzmann distribution. If the optical power of a signal light is so large that the speed of stimulated emission cannot be ignored in relation to the relaxation ratio according to the Boltzmann distribution, the density of the Stark levels $Er^{3+}$ is reduced. A hole is formed in a spectrum corresponding to a level in which the density of the Stark levels $Er^{3+}$ is reduced, and the spectrum obtains PDG for a polarized wave of a signal light.

The speed of stimulated emission depends on the absorption and emission cross-sections of an EDF and the optical power of the EDF in the longitudinal direction. If the absorption cross-section and the emission cross-section ($m^2$) are denoted by $\sigma_a(k)$ and $\sigma_e(k)$, respectively, the optical power ($W/m^2$) is denoted by $I(k)$, and the photon energy is denoted by $$\hbar w(k),$$

the rate equation of two-level system is represented by the following equation:

$$\frac{\partial}{\partial t}\left(\frac{N2}{Nt}\right) = \sum_{k=1}^{k} \frac{I(k) \cdot \sigma_n(k)}{\hbar\omega(k)} - \left[\sum_{k=1}^{k} \frac{\{\sigma_a(k) \cdot \sigma_e(k)\} \cdot I(k)}{\hbar\omega(k)} + \frac{1}{\tau_2}\right] \cdot \left(\frac{N2}{Nt}\right) \quad (1)$$

In the equation (1), k denotes the wavelength, Nt denotes the total number of erbium atoms, N2 denotes the number of erbium atoms in the higher level, and $\tau_2$ denotes the period of time of spontaneous emission.

In addition, in the equation (1), f(k) is a parameter for characterizing the wavelength of the speed of stimulated emission. The parameter is represented by the following equation (2):

$$f(k) = \frac{\{\sigma_a(k) \cdot \sigma_e(k)\} \cdot I(k)}{\hbar\omega(k)} \quad (2)$$

As can be seen from the equation (2), the wavelength characteristics of the speed of simulated emission are proportional to the product of the sum of the absorption and emission cross-sections $\sigma_a(k)$ and $\sigma_e(k)$ and the optical power I(k).

Figure 17:
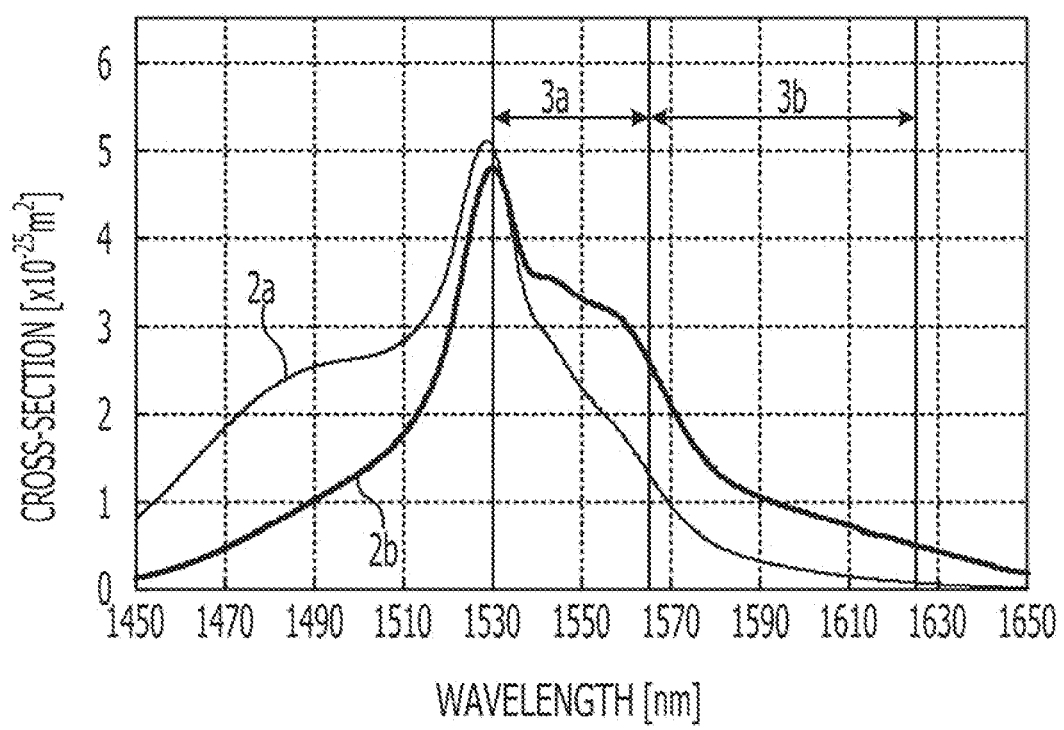
FIG. 17 is a diagram illustrating the relationships between the absorption and emission cross-sections and the wavelength of an erbium-doped fiber (EDF).

FIG. 17 is a diagram illustrating the relationships between the absorption and emission cross-sections and the wavelength of an EDF. In FIG. 17, the vertical axis represents the absorption cross-section and the emission cross-section, and the horizontal axis represents the wavelength. In FIG. 17, a band extending from a wavelength of 1530 nm to a wavelength of 1565 nm is a C band 3a, and a band extending from a wavelength of 1565 nm to a wavelength of 1625 nm is an L band 3b. As illustrated in FIG. 17, an absorption cross-section 2a starts increasing gradually at a wavelength of about 1450 nm and peaks at a wavelength of about 1530 nm. The absorption cross-section 2a then starts decreasing as the wavelength increases more than 1530 nm. Therefore, in the C band 3a and the L band 3b, the absorption cross-section 2a is larger on the short wavelength side than on the long wavelength side.

Similarly, an emission cross-section 2b starts increasing gradually at a wavelength of about 1450 nm and peaks at a wavelength of about 1530 nm. The emission cross-section 2b then starts decreasing as the wavelength increases more than 1530 nm. Therefore, in the C band 3a and the L band 3b, the emission cross-section 2b is larger on the short wavelength side than on the long wavelength side.

Next, the wavelength characteristics of the optical power in an EDF will be described. The gain wavelength characteristics $G(\lambda)$ [dB/m] of the EDF per unit length can be expressed by the following equation (3):

$$G(\lambda) = t \cdot g(\lambda) - (1-t) \cdot \alpha(\lambda) \quad (3)$$

In the equation (3), t denotes the population inversion, $g(\lambda)$ denotes the gain coefficient, and $\alpha(\lambda)$ denotes the absorption coefficient.

Figure 18:
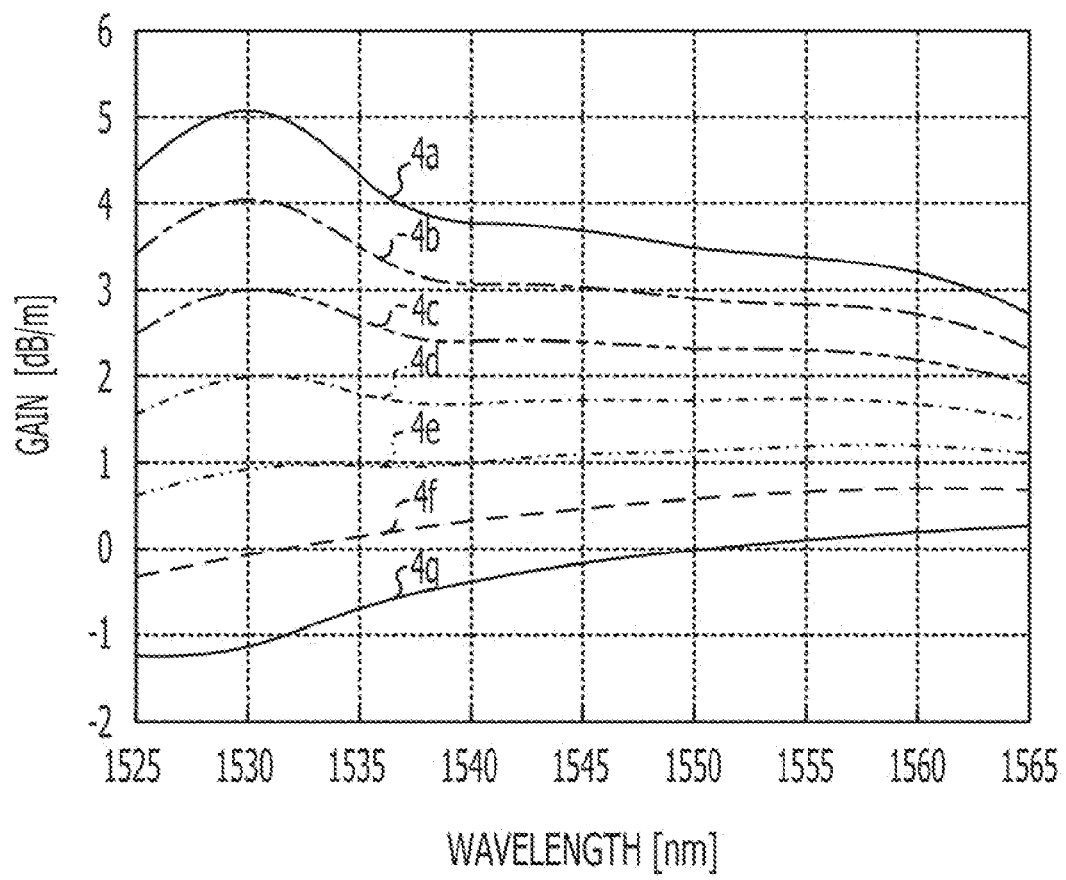
FIG. 18 is a diagram illustrating the gain wavelength characteristics of an EDF per unit length corresponding to a C band.

FIG. 18 is a diagram illustrating the gain wavelength characteristics of an EDF per unit length corresponding to the C band. In FIG. 18, the vertical axis represents the gain coefficient, and the horizontal axis represents the wavelength. A waveform 4a represents the relationship between the gain and the wavelength when the population inversion t is 1.0, a waveform 4b represents the relationship between the gain and the wavelength when the population inversion t is 0.9, and a waveform 4c represents the relationship between the gain and the wavelength when the population inversion t is 0.8. A waveform 4d represents the relationship between the gain and the wavelength when the population inversion t is 0.7, a waveform 4e represents the relationship between the gain and the wavelength when the population inversion t is 0.6, and A waveform 4f represents the relationship between the gain and the wavelength when the population inversion t is 0.5. A waveform 4g represents the relationship between the gain and the wavelength when the population inversion t is 0.4. As illustrated in FIG. 18, when the population inversion t is 0.4, the gain on the long wavelength side is larger than that on the short wavelength side. In contrast, when the population inversion t is 0.7 or more, the gain on the short wavelength side is larger than that on the long wavelength side.

Figure 19:
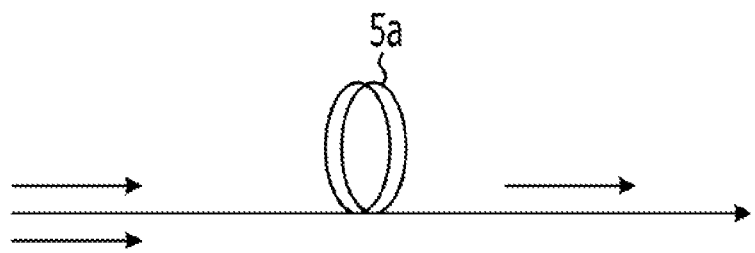
FIG. 19 is a diagram illustrating a simulation model of the wavelength characteristics of the optical power of the EDF in the longitudinal direction corresponding to the C band.

FIG. 19 is a diagram illustrating a simulation model of the wavelength characteristics of the optical power of the EDF in the longitudinal direction corresponding to the C band. The length of an EDF 5a is 12 m. In the simulation model of FIG. 19, twenty-one waves of signal lights having wavelengths of 1525 nm to 1565 nm were input to the EDF 5a, which was excited by 980 nm and 200 mW. In addition, the light quantity of each input signal lights was −15 dBm/ch.

Figure 20:
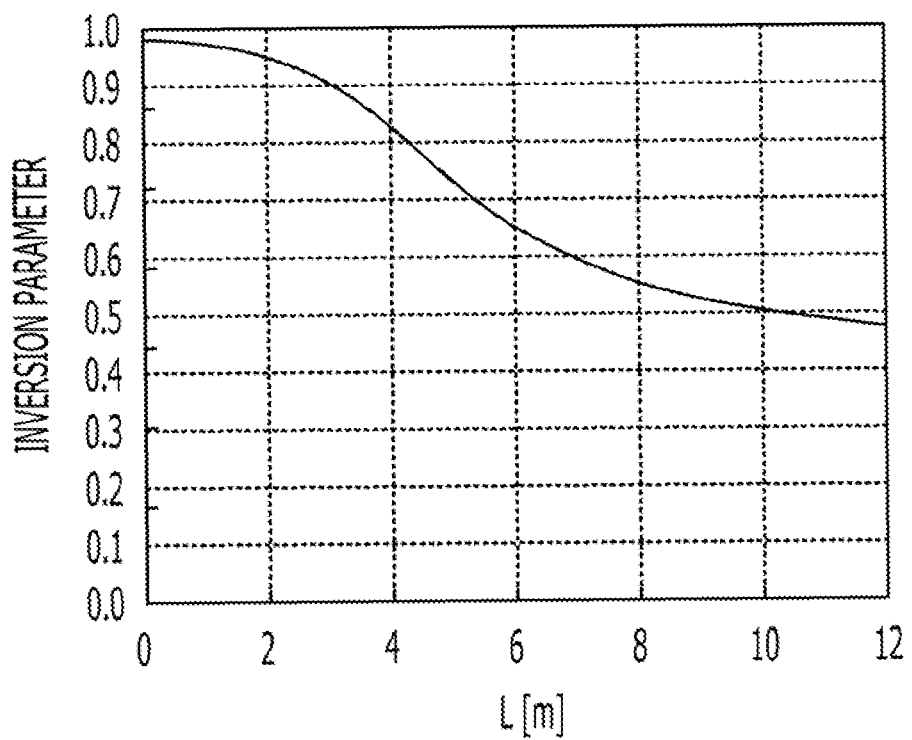
FIG. 20 is a diagram illustrating the simulation results of the simulation model illustrated in FIG. 19.

FIG. 20 is a diagram illustrating the simulation results of the simulation model illustrated in FIG. 19. In FIG. 20, the vertical axis represents the magnitude of the population inversion, and the horizontal axis represents the length of the EDF in the longitudinal direction. As illustrated in FIG. 20, the population inversion is 0.65 or more from a point of 0 m to a point of 6 m of the EDF, whose overall length is 12 m. Thus, when the population inversion is 0.65 or more, the gain on the short wavelength side is larger than that on the long wavelength side as illustrated in FIG. 18.

Figure 21:
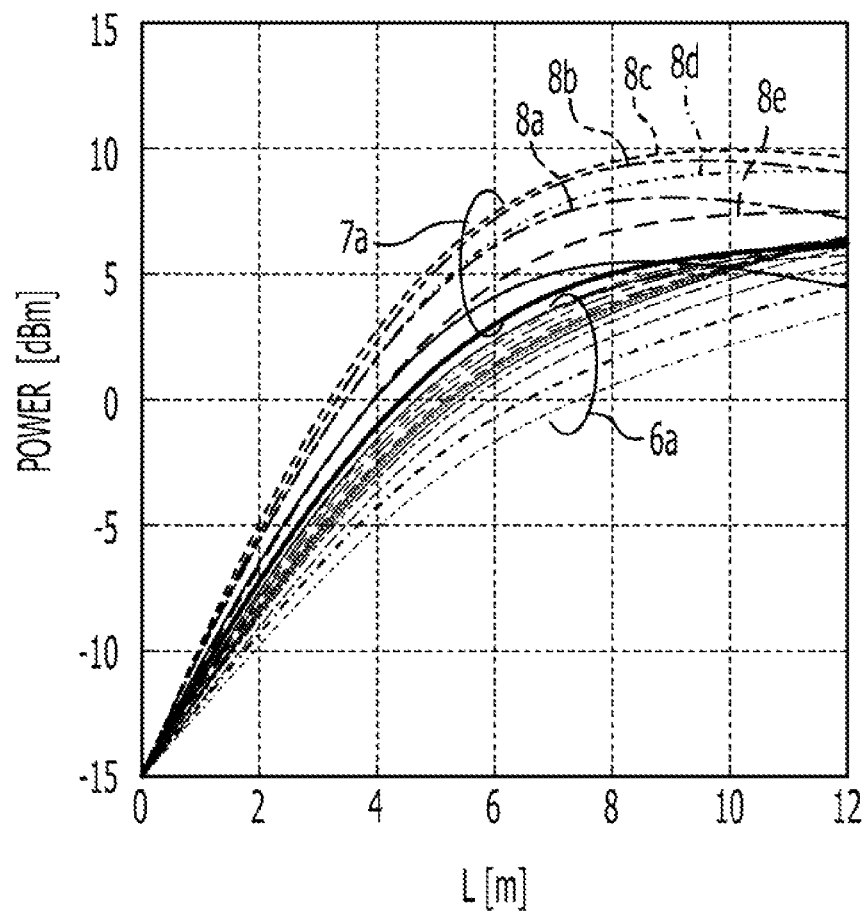
FIG. 21 is a diagram illustrating, in the simulation model illustrated in FIG. 19, the distribution of the optical power of the EDF in the longitudinal direction in relation to the wavelength.

FIG. 21 is a diagram illustrating, in the simulation model illustrated in FIG. 19, the distribution of the optical power of the EDF in the longitudinal direction in relation to the wavelength. In FIG. 21, the vertical axis represents the power of the signal lights, and the horizontal axis represents the length of the EDF in the longitudinal direction. Each of waveforms 6a of FIG. 21 represents the relationship between the power of the signal lights and the length of the EDF in the longitudinal direction when the wavelength varies from 1539 nm to 1565 nm. Each of waveforms 7a of FIG. 21 represents the relationship between the power of the signal lights and the length of the EDF in the longitudinal direction when the wavelength varies from 1525 nm to 1537 nm. A waveform 8a represents the relationship between the power of the signal lights and the length of the EDF in the longitudinal direction when the wavelength is 1527 nm. A waveform 8b represents the relationship between the power of the signal lights and the length of the EDF in the longitudinal direction when the wavelength is 1529 nm. A waveform 8c represents the relationship between the power of the signal lights and the length of the EDF in the longitudinal direction when the wavelength is 1531 nm. A waveform 8d represents the relationship between the power of the signal lights and the length of the EDF in the longitudinal direction when the wavelength is 1533 nm. A waveform 8e represents the relationship between the power of the signal lights and the length of the EDF in the longitudinal direction when the wavelength is 1535 nm.

By comparing the waveforms 6a and the waveforms 7a in FIG. 21, it can be seen that, up to a point of 6 m of the EDF in the longitudinal direction, the power of the signal lights on the short wavelength side, which covers from a wavelength of 1525 nm to a wavelength of 1537 nm, is larger than that of the signal lights on the long wavelength side, which covers from a wavelength of 1539 nm to a wavelength of 1565 nm. In addition, at a point of 12 m of the EDF in the longitudinal direction, it can be seen that the power of the signal lights on the short wavelength side, which covers from a wavelength of 1525 nm to a wavelength of 1537 nm, is larger than that of the signal lights on the long wavelength side, which covers from a wavelength of 1539 nm to a wavelength of 1565 nm.

Figure 22:
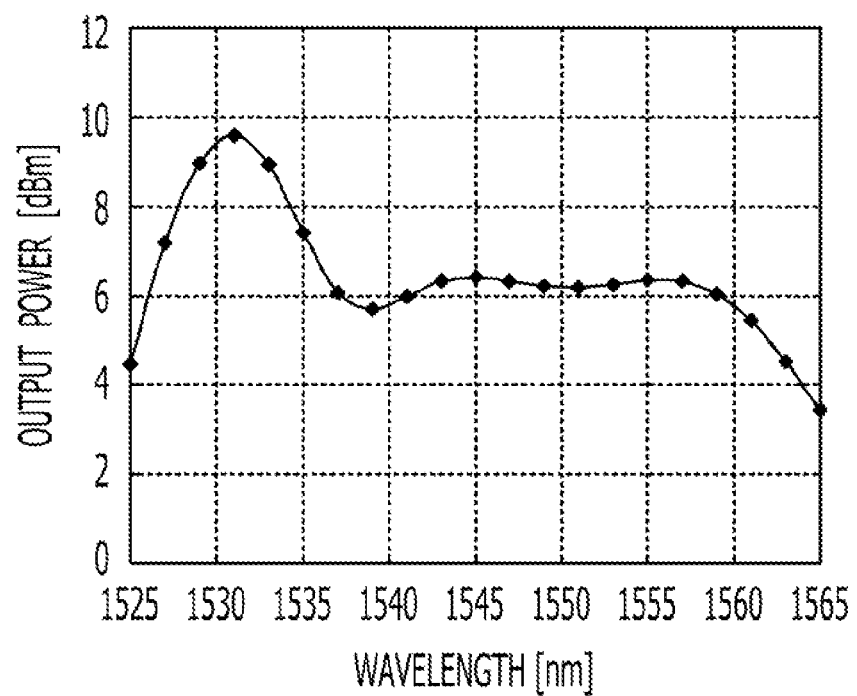
FIG. 22 is a diagram illustrating the spectrum of the output of the EDF in the simulation model illustrated in FIG. 19.

FIG. 22 is a diagram illustrating the spectrum of the output of the EDF in the simulation model illustrated in FIG. 19. In FIG. 22, the vertical axis represents the output power of the signal lights, and the horizontal axis represents the wavelength. In the example illustrated in FIG. 22, the power of the signal lights peaks between a wavelength of 1530 nm and a wavelength of 1535 nm.

Figure 23:
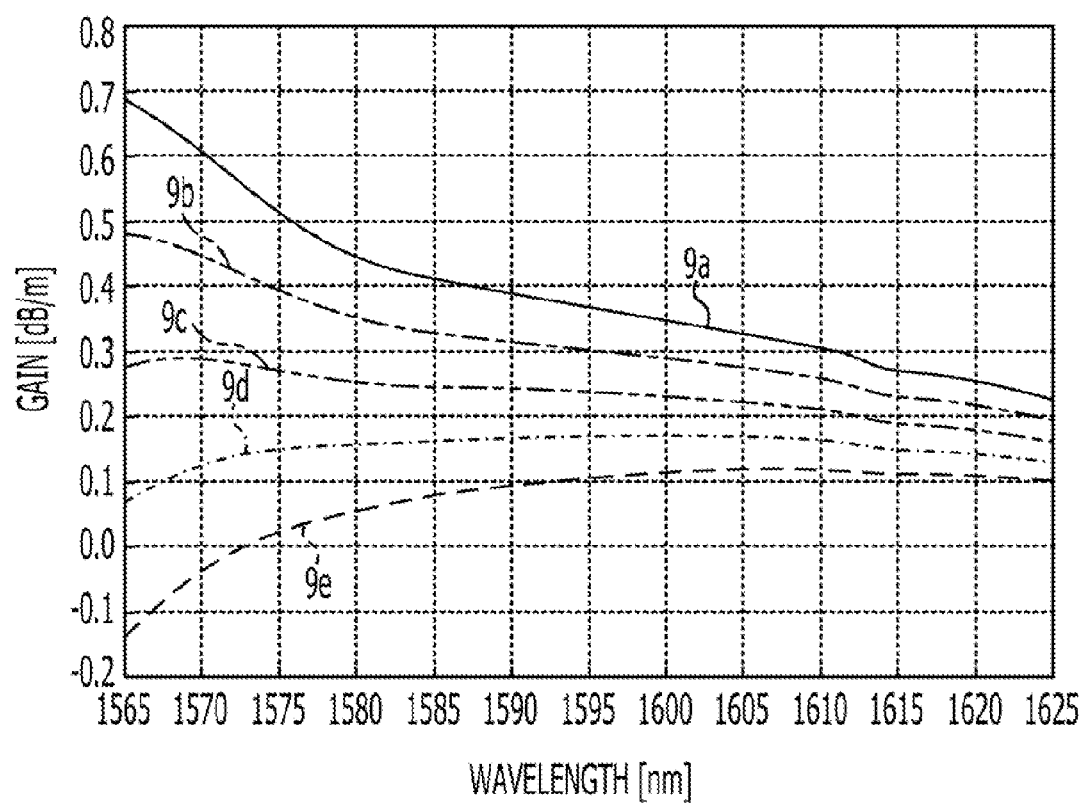
FIG. 23 is a diagram illustrating the gain wavelength characteristics of an EDF per unit length corresponding to an L band.

FIG. 23 is a diagram illustrating the gain wavelength characteristics of an EDF per unit length corresponding to the L band. In FIG. 23, the vertical axis represents the gain coefficient, and the horizontal axis represents the wavelength. A waveform 9a represents the relationship between the gain and the wavelength when the population inversion t is 0.5, a waveform 9b represents the relationship between the gain and the wavelength when the population inversion t is 0.45, and a waveform 9c represents the relationship between the gain and the wavelength when the population inversion t is 0.4. A waveform 9d represents the relationship between the gain and the wavelength when the population inversion t is 0.35, and a waveform 9e represents the relationship between the gain and the wavelength when the population inversion t is 0.3. As illustrated in FIG. 23, when the population inversion t is 0.3, the gain on the long wavelength side is larger than that on the short wavelength side. When the population inversion t is 0.4, the gain on the long wavelength side is almost the same as that on the short wavelength side. In addition, when the population inversion t is 0.45 or more, the gain on the short wavelength side is larger than that on the long wavelength side.

Figure 24:
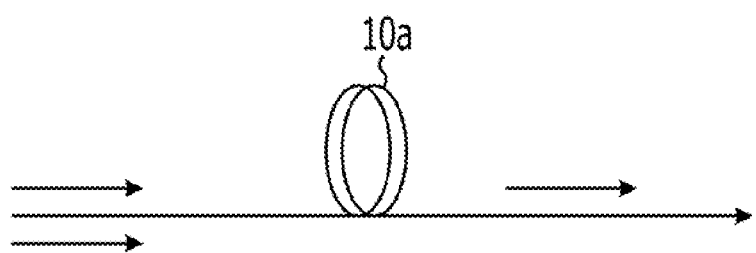
FIG. 24 is a diagram illustrating a simulation model of the wavelength characteristics of the optical power of the EDF in the longitudinal direction corresponding to the L band.

FIG. 24 is a diagram illustrating a simulation model of the wavelength characteristics of the optical power of the EDF in the longitudinal direction corresponding to the L band. The length of an EDF 10a is 120 m. In the simulation model of FIG. 24, twenty-one waves of signal lights having a wavelength of 1570 nm to 1610 nm were input to the EDF 10a, which was excited by 1460 nm and 300 mW. In addition, the light quantity of each input signal light was −15 dBm/ch.

Figure 25:
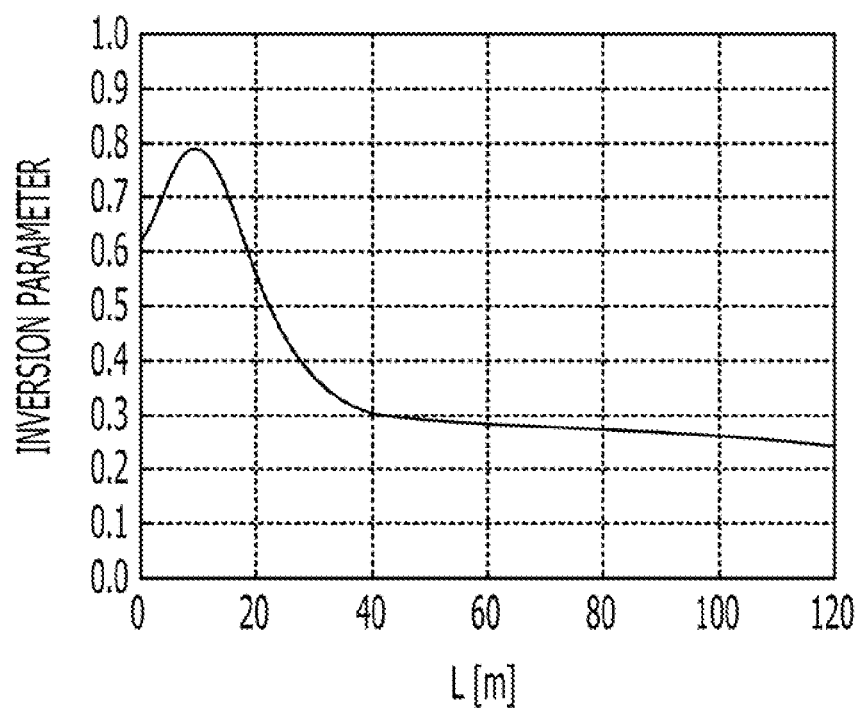
FIG. 25 is a diagram illustrating the simulation results of the simulation model illustrated in FIG. 24.

FIG. 25 is a diagram illustrating the simulation results of the simulation model illustrated in FIG. 24. In FIG. 25, the vertical axis represents the magnitude of the population inversion, and the horizontal axis represents the length of the EDF in the longitudinal direction. As illustrated in FIG. 25, the population inversion is 0.4 or more from a point of 0 m to a point of 30 m of the EDF, whose overall length is 120 m. Thus, when the population inversion is 0.4 or more, the gain on the short wavelength side is larger than that on the long wavelength side as illustrated in FIG. 25.

Figure 26:
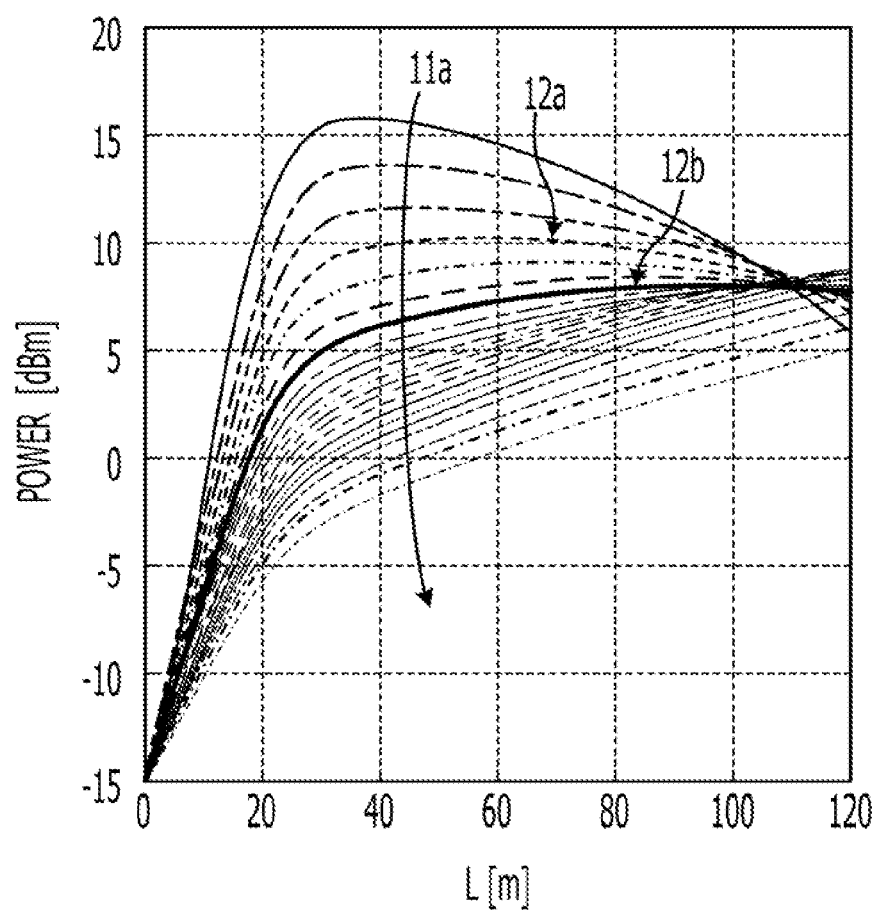
FIG. 26 is a diagram illustrating, in the simulation model illustrated in FIG. 24, the distribution of the optical power of the EDF in the longitudinal direction in relation to the wavelength.

FIG. 26 is a diagram illustrating, in the simulation model illustrated in FIG. 24, the distribution of the optical power of the EDF in the longitudinal direction in relation to the wavelength. In FIG. 26, the vertical axis represents the power of the signal lights, and the horizontal axis represents the length of the EDF in the longitudinal direction. Each of waveforms 11a of FIG. 26 represents the relationship between the power of the signal lights and the length of the EDF in the longitudinal direction when the wavelength varies from 1570 nm to 1610 nm. In the waveforms 11a, a waveform 12a represents the relationship between the power of the signal lights and the length of the EDF in the longitudinal direction when the wavelength is 1576 nm. A waveform 12b represents the relationship between the power of the signal lights and the length of the EDF in the longitudinal direction when the wavelength is 1582 nm. As illustrated in FIG. 26, the optical power on the short wavelength side is larger than that on the long wavelength side in almost the entire range.

Figure 27:
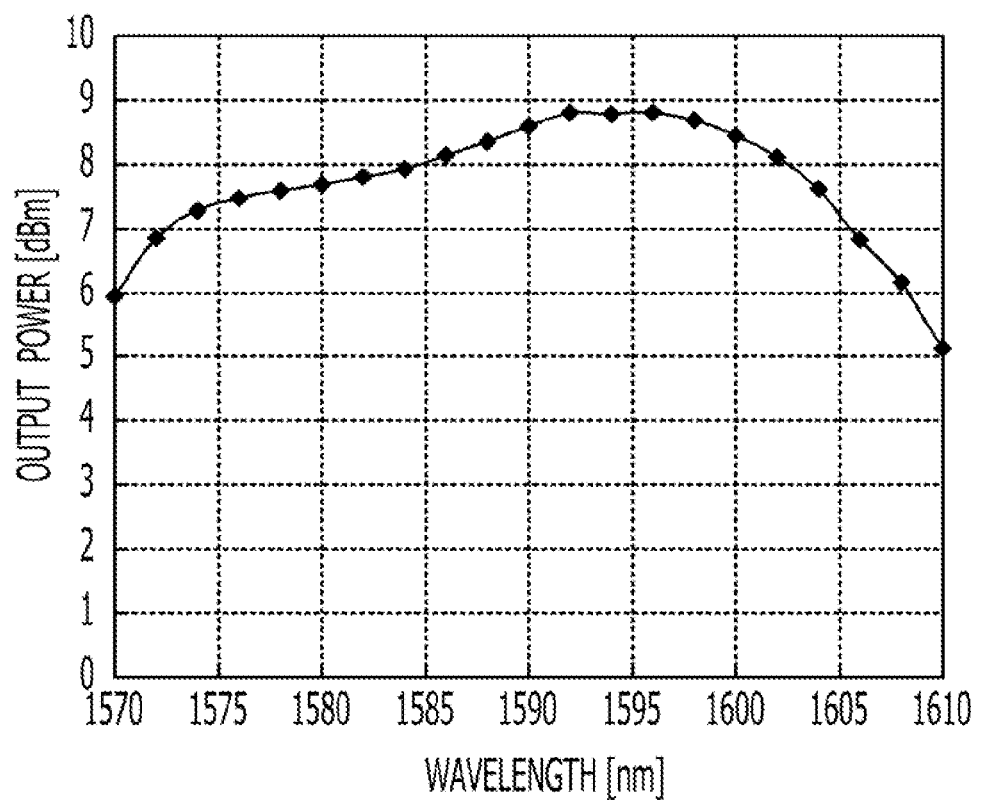
FIG. 27 is a diagram illustrating the spectrum of the output of the EDF in the simulation model illustrated in FIG. 24.

FIG. 27 is a diagram illustrating the spectrum of the output of the EDF in the simulation model illustrated in FIG. 24. In FIG. 27, the vertical axis represents the output power of the signal lights, and the horizontal axis represents the wavelength. In the example illustrated in FIG. 27, the power of the signal lights peaks between a wavelength of 1590 nm and a wavelength of 1595 nm.

Figure 28:
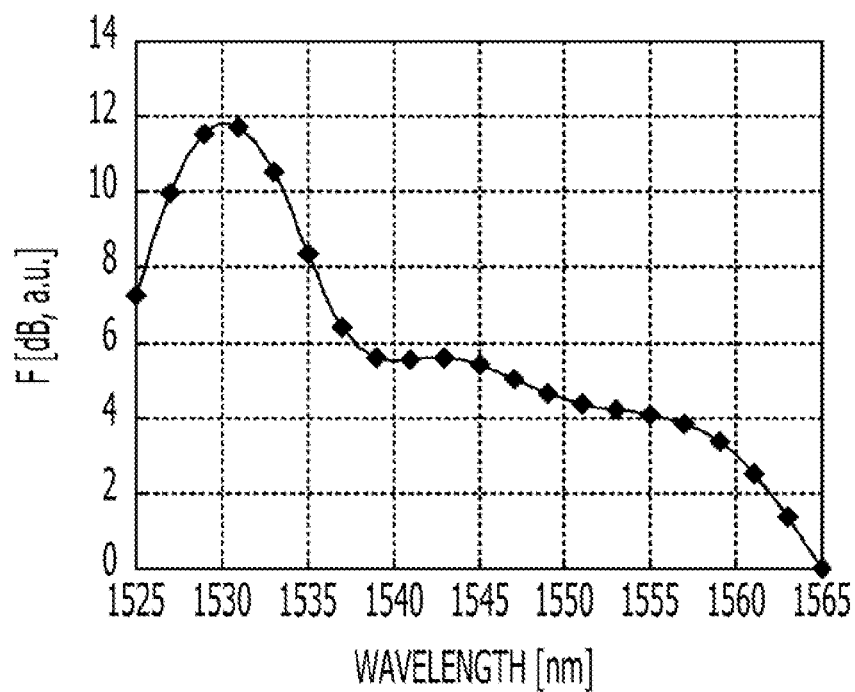
FIG. 28 is a diagram illustrating the relationship between the wavelength of the C band and a parameter F of stimulated emission.

Next, FIG. 28 illustrates results obtained by assigning the absorption cross-section and the emission cross-section illustrated in FIG. 17 and the power distribution of the signal lights illustrated in FIG. 21 to the above-mentioned equation (2). FIG. 28 is a diagram illustrating the relationship between the wavelength in the C band and the parameter F of the stimulated emission. In FIG. 28, the vertical axis represents the parameter F for characterizing the speed of stimulated emission, and the horizontal axis represents the wavelength. As illustrated in FIG. 28, the parameter F is larger on the short wavelength side than on the long wavelength side.

Figure 29:
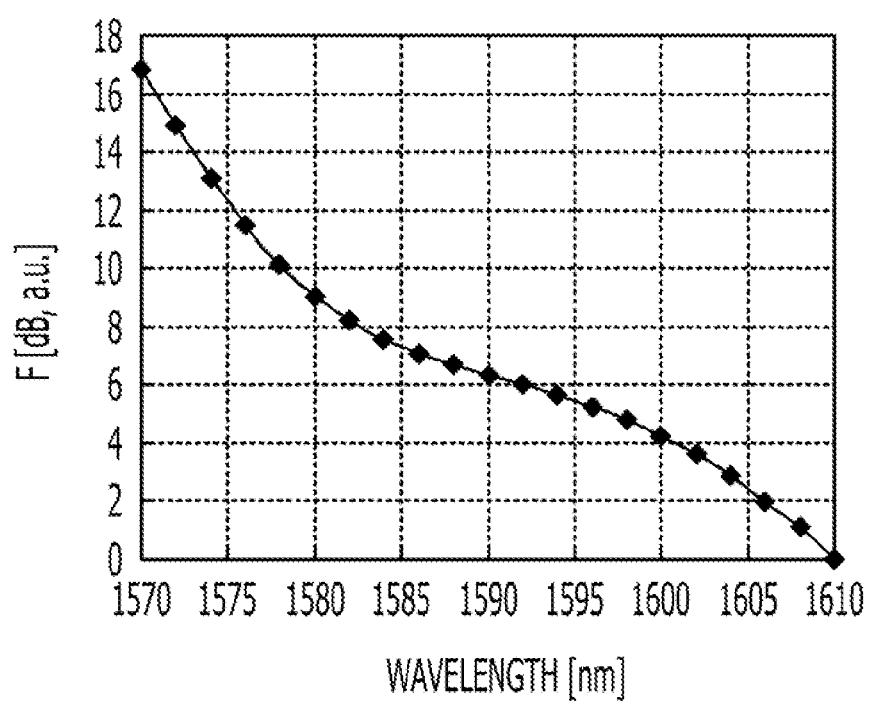
FIG. 29 is a diagram illustrating the relationship between the wavelength of the L band and the parameter F of stimulated emission.

FIG. 29 illustrates results obtained by assigning the absorption cross-section and the emission cross-section illustrated in FIG. 17 and the power distribution of the signal lights illustrated in FIG. 26 to the above-mentioned equation (2). FIG. 29 is a diagram illustrating the relationship between the wavelength in the L band and the parameter F of the stimulated emission. In FIG. 29, the vertical axis represents the parameter F for characterizing the speed of stimulated emission, and the horizontal axis represents the wavelength. As illustrated in FIG. 29, the parameter F is larger on the short wavelength side than on the long wavelength side.

Here, the higher the speed of stimulated emission, the larger the PHB, which has PDG for a polarized wave of the reference signal light. Therefore, both in the C band and in the L band, the PDG for the polarized wave of a signal light is larger on the short wavelength side than on the long wavelength side.

The DP-QPSK signal in the above embodiments may substitute a dual-polarization-multiplexed signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

ADVANTAGEOUS EFFECTS

A transmission apparatus according to aspects of the embodiments have an effect of effectively utilizing the amplification band of an EDFA while reducing the likelihood of and/or preventing the deterioration of the transmission quality.

The invention claimed is:

1. An optical transmission apparatus comprising:
an optical amplifier configured to amplify a wavelength-division multiplexed signal light using an amplifying medium doped with a rare earth ion;
at least one first optical transmitter configured to output a dual-polarization-multiplexed-QPSK ("DP-QPSK") signal which is generated by multiplexing two QPSK signals each having different polarization and the same wavelength, the DP-QPSK signal having a wavelength included in of a polarization hole burning band of the optical amplifier;
a second optical transmitter configured to output a wavelength of a non polarization signal to a long wavelength side of the amplification band of the optical amplifier other than the polarization hole burning band; and
an optical multiplexer configured to input the DP-QPSK signal and the non polarization signal and output a wavelength-division multiplexed signal to the optical amplifier, the wavelength-division multiplexed signal comprising the non polarization signal and the DP-QPSK signal.

2. The transmission apparatus according to claim 1,
wherein the at least one first optical transmitter is a plurality of first optical transmitters, and
wherein the optical multiplexer receives a plurality of DP-QPSK signals from the plurality of first optical transmitters, and multiplexes the plurality of DP-QPSK signals and another non polarization signal in a state in which the plurality of signals having wavelengths different from one another are allocated to the short wavelength side of the amplification band.

3. The transmission apparatus according to claim 1,
wherein the optical multiplexer multiplexes the DP-QPSK signals and the non polarization signals in a state in which a wavelength band to which the DP-QPSK signals are allocated and a wavelength band to which the non polarization signals are allocated are separated from each other by a certain wavelength band.

4. The transmission apparatus according to claim 1,
wherein the non polarization signal is modulated by intensity modulation or phase modulation.

5. The transmission apparatus according to claim 1,
wherein the DP-QPSK signal includes a polarization signal and another polarization signal which are substantially independently modulated by a phase modulation format respectively.

6. The transmission apparatus according to claim 1,
wherein the non polarization signal has a substantially linear polarization signal output at a transmitter.

7. A transmission system comprising:
an optical amplifier configured to have a polarization hole burning band in which a signal gain and an amplified spontaneous emission gain are different from each other depending on a status of polarized wave of a signal, and configured to use an amplifying medium that has been doped with a rare earth ion and whose signal gain and amplified spontaneous emission gain vary in the polarization hole burning band in accordance with the number of wavelengths of signals;

a plurality of optical transmitters configured to output a dual-polarization-multiplexed-QPSK ("DP-QPSK") signal which is generated by multiplexing two QPSK signals each having different polarization and the same wavelength, the DP-QPSK signal and a non polarization signal, and configured to allocate the DP-QPSK signal to the polarization hole burning band; and an optical multiplexer configured to multiplex, from among the signals output from the plurality of optical transmitters, the signals having wavelengths that are different from each other, and configured to output the multiplexed signals to the optical amplifier, to which the optical multiplexer is optically connected.

* * * * *